US012593176B2

(12) United States Patent
Whitwell et al.

(10) Patent No.: US 12,593,176 B2
(45) Date of Patent: Mar. 31, 2026

(54) SYSTEM, APPARATUS AND METHODS FOR COUPLING A VOICE COIL ASSEMBLY AND DIAGRAPHAM FOR ACOUSTIC TRANSDUCER

(71) Applicant: Tectonic Audio Labs, Inc., Woodinville, WA (US)

(72) Inventors: Timothy C. Whitwell, Kirkland, WA (US); Sukvasant Tantikovit, Hong Kong (CN); Philip C. Bunch, Lake Stevens, WA (US)

(73) Assignee: Tectonic Audio Labs, Inc., Woodinville, WA (US)

( * ) Notice: Subject to any disclaimer, the term of this patent is extended or adjusted under 35 U.S.C. 154(b) by 0 days.

(21) Appl. No.: 19/013,326

(22) Filed: Jan. 8, 2025

(65) Prior Publication Data

US 2025/0227419 A1 Jul. 10, 2025

Related U.S. Application Data

(60) Provisional application No. 63/618,421, filed on Jan. 8, 2024.

(51) Int. Cl.

| | |
|---|---|
| ***H04R 9/06*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 31/00*** | (2006.01) |

(52) U.S. Cl.
CPC ............... *H04R 7/045* (2013.01); *H04R 7/18* (2013.01); *H04R 9/025* (2013.01); *H04R 9/045* (2013.01); *H04R 9/046* (2013.01); *H04R 9/06* (2013.01); *H04R 31/003* (2013.01); *H04R 2440/01* (2013.01)

(58) Field of Classification Search
CPC .......... H04R 7/045; H04R 7/18; H04R 9/025; H04R 9/043; H04R 9/045; H04R 9/046; H04R 9/06; H04R 31/003; H04R 2440/01
See application file for complete search history.

(56) References Cited

U.S. PATENT DOCUMENTS 7,970,162 B2 * 6/2011 Sumitani .............. H04R 31/006 381/407
11,457,315 B2 * 9/2022 Xiao ........................ H04R 7/18
2016/0219353 A1 * 7/2016 Whitwell ............... H04R 7/045

* cited by examiner

*Primary Examiner* — Huyen D Le
(74) *Attorney, Agent, or Firm* — Toussaint L. Myricks

(57) ABSTRACT

A system comprising a diaphragm having a first face and a second face, a roll surround disposed around a perimeter of the first face of the diaphragm, a modal coupling apparatus comprising a plurality of connecting arms and a central body, the modal coupling apparatus coupled to the second face of the diaphragm using the plurality of connecting arms, the central body having a shaped first end for receiving a voice coil former, a voice coil wound upon and secured to an outer surface on a first end of the voice coil former, a second end of the voice coil former placed within the shaped first end of the central body, and a positive electrical terminal and a negative electrical terminal, each terminal coupled to the voice coil for transmitting an electrical current through the voice coil upon receiving electrical power.

12 Claims, 26 Drawing Sheets

| Bending Mode | Number of nodal lines | Excited in HARP (Y/N) |
|---|---|---|
| 1 | 2 | Y |
| 2 | 3 | N |
| 3 | 4 | Y |
| 4 | 5 | N |
| 5 | 6 | Y |

612

SYSTEM, APPARATUS AND METHODS FOR COUPLING A VOICE COIL ASSEMBLY AND DIAGRAPHAM FOR ACOUSTIC TRANSDUCER

FIELD

The present disclosure relates generally to the field of audio systems and, in particular but not exclusively, relates to a modal coupler device within an acoustic transducer for coupling mechanical force from a voice coil assembly to a high aspect ratio diaphragm.

BACKGROUND

Acoustic diaphragms used in conventional acoustic transducers are commonly designed and manufactured with coil formers that mechanically couple a voice coil assembly to the inner side of an acoustic diaphragm that vibrates in response to received mechanical force structurally conducted from the voice coil assembly. Due to industrial design and consumer trends, loudspeaker systems and the acoustic transducers within them frequently need to conform within increasingly slimmer and more dimensionally constrained products such as flat display screen televisions and slim soundbars. As variations in the shapes of acoustic transducers and the diaphragms they contain have been created and distributed for widespread consumer and industrial use, there has been a growing need for coupler devices that can not only efficiently transfer mechanical force from voice coil assemblies but can do so over diaphragm geometries that may be structurally inefficient. More specifically, many conventional coupler devices are commonly thin walled cylinder structures upon which a voice coil is wound on one end with an opposite end connected to a diaphragm while the diaphragms onto which mechanical force is to be distributed are taking on an ever increasing variety of structural shapes, including extended rectangular and oval/racetrack-like shapes that are routinely now referred to as "high aspect ratio" diaphragms.

Coupler devices such as coil formers are commonly used within audio transducers called Balanced Mode Radiators ("BMRs") and such devices require structural bending wave mode balancing to achieve optimal acoustic performance in terms of distributed sound pressure level and sound power response. Increasingly, however, it has come to be realized that the use of coil formers directly connected onto high aspect ratio diaphragms can substantially reduce or compromise the structural bending mode shapes that radiate acoustic signals from these types of diaphragms. Hence, there is a growing need for an alternative structure for a coupler device that can be used efficiently with such high aspect ratio diaphragms to preserve and sustain optimal structural bending mode radiating performance.

Moreover, as such diaphragms are not only extended in length but also shortened in width, a need also exists for a plurality of electrodynamic motors across the length of such extended diaphragms to achieve optimal balancing of their structural bending modes and to provide additional driving force and thermal power handling capability to achieve sufficient sound pressure levels. As such, a growing need exists for modal coupler devices that can couple the mechanical force generated from one or more voice coil assemblies onto the bending modes of vibrating diaphragms comprised of select material types. These vibrating diaphragms radiate acoustical signals over bandwidths that are audible to human ears. In the case of a high aspect ratio drive unit, due to its high aspect ratio design, the diaphragm is more susceptible to bending over its longitudinal axis and there are often bending modes within the audio band that are poorly controlled leading to unpleasantly varying amplitude-frequency responses. Also, a high aspect ratio drive unit has inherently compromised directivity over the longitudinal axis at higher frequencies which further exacerbates the acoustic performance of audio transducers including such drive units. Hence, there is also a growing need for an optimal positional arrangement for placement of coupler devices for use in acoustic transducers having multiple voice coil assemblies.

An acoustic transducer including a diaphragm operating both in low frequency piston modes and higher frequency bending modes and configured such that the net transverse modal velocity tends to zero is described in U.S. Pat. No. 7,916,878. The inventors describe how the mass of the voice coil assembly when coupled to the diaphragm unbalances the mode shapes of the free diaphragm that has desirable acoustic properties of radiating substantially flat on-axis sound pressure level (SPL), and smooth and extended sound power level response (SWL), resulting from the net transverse modal velocity tending to zero. The inventors teach how the vibrational modes in an unbalanced diaphragm with a coupled voice coil assembly may be rebalanced through a prescribed diameter by locating the voice coil assembly onto the diaphragm relative to the diameter of the diaphragm, and the addition of at least one impedance means with mass and position appropriately scaled relative to the mass of the voice coil assembly and diameter of the diaphragm, such that the mode shapes and desirable acoustic properties of the free diaphragm are recovered. In addition to circular shaped diaphragms, substantially rectangular shaped diaphragms are also amenable to modal rebalancing and methodologies like the case of circular diaphragms are described in U.S. Pat. No. 7,916,878.

However, the shape of a coupler that couples the drive force of a voice coil assembly to a diaphragm can greatly affect the shapes of the bending modes produced by a vibrating diaphragm due to the locations of force input to the diaphragm from the coupler as well as the mechanical impedance presented by the coupler to the diaphragm. For instance, in a circular shaped diaphragm, a concentrically mounted circular shaped coupler of small radial thickness will not substantially influence the radial mode shapes of the diaphragm due to the shape of the coupler although circumferential modes may be affected by the circular shaped coupler. These modes, however, do not contribute significantly to the acoustic radiation from the diaphragm. For a substantially rectangular shaped diaphragm, a circular shaped coupler can adversely influence the acoustically relevant mode shapes of the diaphragm due to the diaphragm bending longitudinally over the circumference of the circular shaped coupler, and the coupler resisting such bending due to the coupler having a mechanical impedance that is not inconsequential relative to the mechanical impedance of the diaphragm.

Hence, there is a pressing need to remove the direct connection of the coil former from a diaphragm and to instead add a modal coupler that is directly connected to a diaphragm and that can transfer the received electromagnetic force input on one end from a connected coil former to its other end that is coupled to the diaphragm through linear shaped connectors of narrow dimension in the longitudinal direction of a substantially rectangular or oval/racetrack shaped diaphragm. The use of a modal coupler connected in this manner ensures that there is minimal adverse influence or distortion of the bending modes of the diaphragm to achieve optimal performance that is comparable to that of a "free panel" diaphragm driven by a "perfect" massless force. The modal coupler described herein with linear shaped connectors presents a more ideal coupling to the bending modes of a vibrating diaphragm such that any unbalanced radiation causing unevenness in the frequency response of a high aspect ratio drive unit will be eliminated or substantially reduced, and the net transverse modal velocity over the diaphragm will tend more closely to zero than with a coupling device as described in the prior art.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

In the description to follow, various aspects of embodiments of force balanced audio transducers will be described, and specific configurations will be set forth. Numerous and specific details are given to provide an understanding of these embodiments. The aspects disclosed herein can be practiced without one or more of the specific details, or with other methods, components, systems, services, etc. In other instances, structures or operations are not shown or described in detail to avoid obscuring relevant inventive aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification do not necessarily all refer to the same embodiment. Furthermore, particular features, structures, or characteristics may be combined in any suitable manner in one or more embodiments.

Terminology used for the purpose of describing particular aspects only is not intended to be limiting of the subject matter disclosed herein. Spatially relative terms, such as "beneath", "below", "lower", "above", "upper", and the like may be used herein for ease of description of relationships between elements or features, as illustrated in the accompanying figures. It is to be understood that spatially relative terms are intended to encompass different orientations of the apparatus in use or operation in addition to the orientation depicted in the figures. For example, if the apparatus in the figures is turned over, elements described as "below" or "beneath" other elements or features would then be oriented "above the other elements or features. Thus, the exemplary term "below" can encompass both an orientation of above and below. The apparatus may be otherwise oriented (e.g., rotated 90 degrees or at other orientations) and the spatially relative descriptors used here in interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements and/or components, but do not preclude the presence or addition of one or more other features, steps, operations, elements, components, and/or groups thereof.

The terms "or" and "and/or" as used herein are to be interpreted as inclusive or meaning any one or more combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
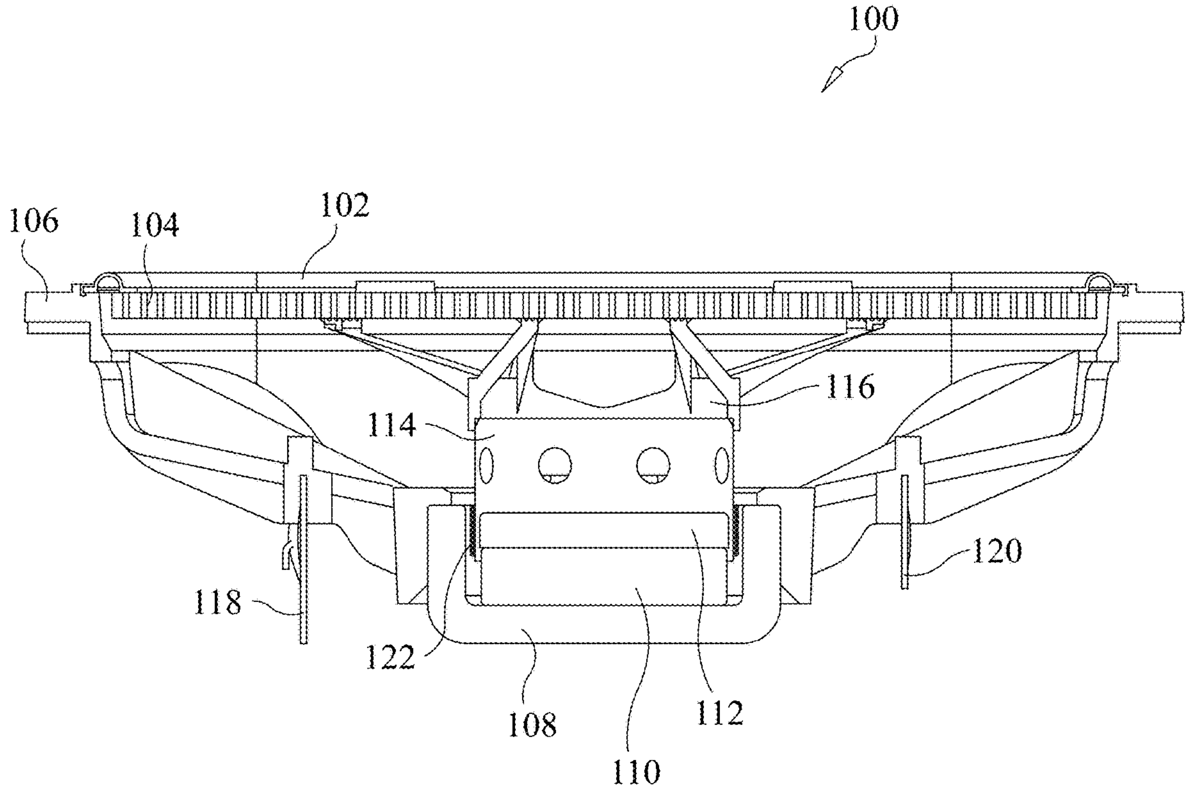
FIG. 1 is an illustration of an audio transducer system in an embodiment.

FIG. 1 is an illustration of an audio transducer system 100 in an embodiment that is comprised of multiple components. These components include a diaphragm 104 with a honeycomb core structure and a roll surround suspension and acoustic seal 102 placed along the perimeter on an outer surface of the diaphragm 104, referred to herein as a first face of the diaphragm 104. A second face of the diaphragm 104 provides an inner surface upon which a plurality of connecting arms from a modal coupler will be connected. For ease of review, the term "roll surround suspension and acoustic seal" will be referred to as a "roll surround." In the illustrated embodiment, both the diaphragm 104 and the roll surround 102 are placed within a structural frame 106 (also referred to as a "basket"). The diaphragm 104 can have a composite structure as is shown in FIG. 1, or a monolithic structure, and be comprised of various materials in alternative embodiments including a variety of metals, plastics, papers, glass fiber, and carbon fiber. Among the options for metals used in the diaphragm 104 are aluminum, titanium and magnesium. Representative plastics used in the diaphragm 104 include acrylonitrile butadiene styrene (referred to as "ABS"), polycarbonate, polypropylene, and nylon/polyoxymethylene. The roll surround 102 placed along the perimeter of the diaphragm 104 provides an acoustic seal preventing an acoustic short circuit between the opposite phase pressure fields generated on either side of the diaphragm 104. The roll surround also provides a mechanical suspension that supports the diaphragm within the frame and provides a mechanical restoring force that returns the diaphragm 104 to its neutral position. The roll surround 102 can be comprised of various materials including, but not limited to, various types of rubber, such as nitrile butadiene rubber (NBR), doped fabric, and mylar film.

The present embodiment of the system 100 further includes a modal coupler 116 connected between an inner surface of the diaphragm 104 and a voice coil former 114. The voice coil former 114 has a voice coil 122 wound upon it on a first end while the other end of the voice coil former 114 is placed within a receiving end of the modal coupler 116. The voice coil 122 wound upon the voice coil former 114 is placed within an air gap defined by a motor return cup 108 on one end and a pole piece 112 and a magnet 110 on the other end. The magnet 110 is mounted securely on an inner surface of the motor return cup 108. The voice coil 122 is suspended within a static magnetic field in the air gap and electrical current flowing through the voice coil 122 gives rise to an electromagnetic force on the voice coil that drives the voice coil former 114 with a force that is transferred to the modal coupler 116 and thereby creates a driving force upon the diaphragm 104 resulting in the radiation of acoustic signals from the audio transducer system 100. The system 100 receives an electrical signal from an audio amplifier at a positive terminal 118 and a negative terminal 120 both of which are electrically coupled to the voice coil 122 in order to drive a varying electric current through the voice coil such that it interacts with the static magnetic field created by an electromagnetic motor comprised of the magnet 110, the pole piece 112, and the motor return cup 108. Collectively in the illustrated embodiment, the combination of voice coil 122, voice coil former 114, magnet 110, pole piece 112, and motor return cup 108 are referred to as a motor drive unit. In alternative embodiments, the motor drive unit may be comprised of more than one magnet in configurations requiring the use of two or more motor drive units.

Figure 2:
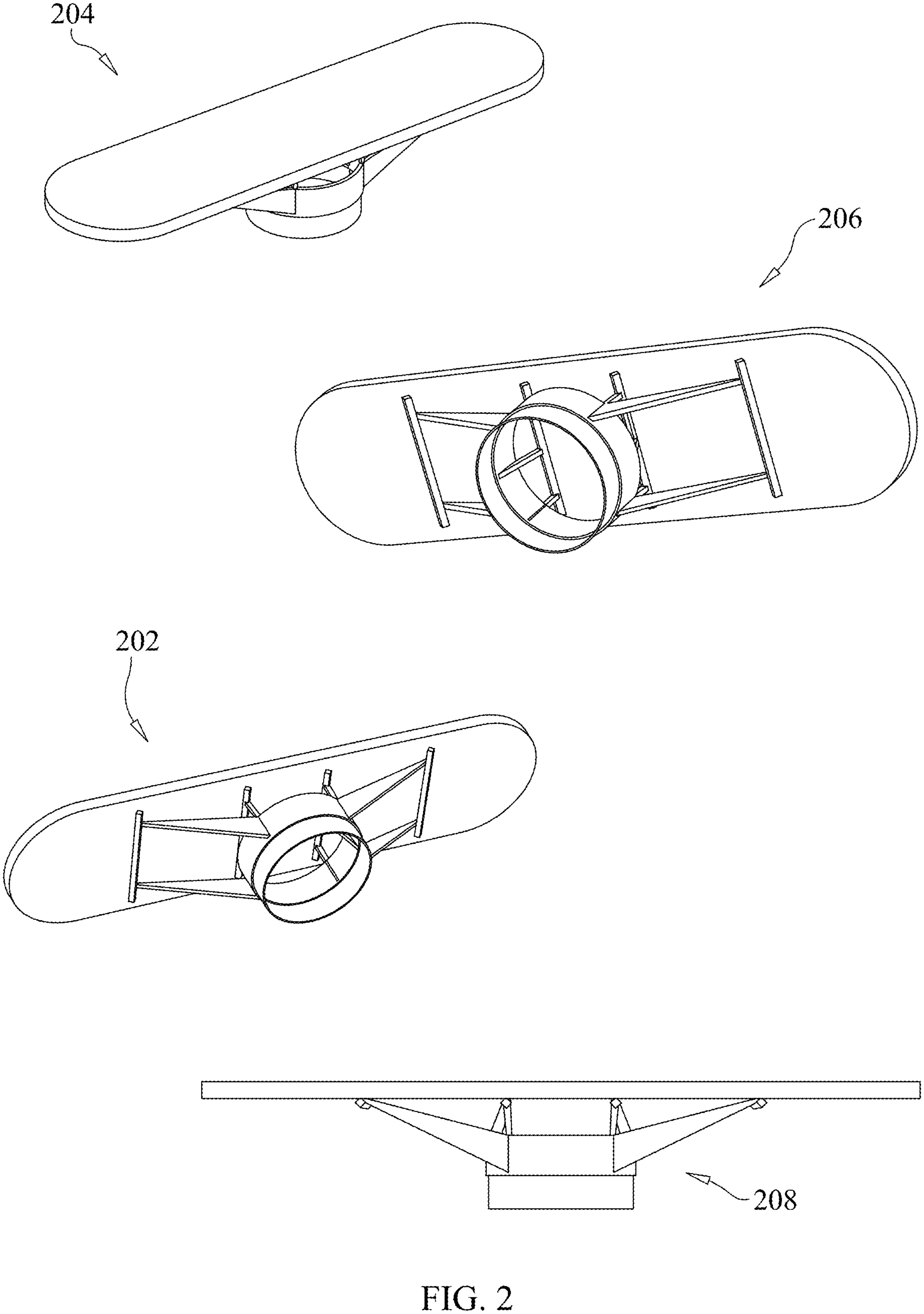
FIG. 2 is an illustration of a modal coupler connected to a racetrack shaped diaphragm in an embodiment.

FIG. 2 is an illustration of a modal coupler connected to a racetrack shaped diaphragm in an embodiment. Racetrack shaped diaphragms are the most common as the generally smooth radius of the curved ends of the diaphragms allows the roll surround to conform to this shape without adversely affecting its function as a suspension element. Rectangular-shaped diaphragms can also be used, though radiused corners are required if a roll surround is to follow the perimeter of a diaphragm. On a rectangular-shaped diaphragm with right-angle corners, the roll surround cannot conform to these right-angle corners and must deviate from following the perimeter of the diaphragm in these corner regions. The current figure illustrates multiple positions of this embodiment of the modal coupler connected to a representative diaphragm. In a first structural view 202, a modal coupler is shown connected to a diaphragm with multiple connecting arms including two pairs of arms extending from opposite ends of the outer surface of a circularly shaped central body of the modal coupler as well as a couple of interconnecting arms extending nearly vertically from the upper end of the modal coupler central body. In a second perspective view 204, The outer surface of a racetrack shaped diaphragm as shown above but connected onto a modal coupler. In a third perspective view 206, the outer surface of the diaphragm can be seen with the modal coupler and its connecting arms and feet connected to the diaphragm. And yet a fourth perspective view 208, a clear view of the modal coupler and its connecting arms can be seen connected directly onto an inner surface of the diaphragm. The modal coupler is connected to the diaphragm by a first plurality of connecting arms which extend from an outer surface of the modal coupler and a plurality of connecting arms extending nearly vertically from an upper end of the modal coupler onto an inner surface of the diaphragm. Each of the connecting arms have mounted on their ends a coupling foot which directly attaches or connects to the inner surface of the diaphragm. In one embodiment, the coupling foot includes a series of ridges and grooves to enhance the connectivity to the diaphragm which is particularly important during vibrational operation as a driving force is applied by a voice coil former through the modal coupler and onto the inner surface of the diaphragm. In one alternative embodiment, the coupling foot can be a more finely textured surface upon which a pressure sensitive adhesive is applied for bonding to the inner surface of the diaphragm.

Figure 3A:
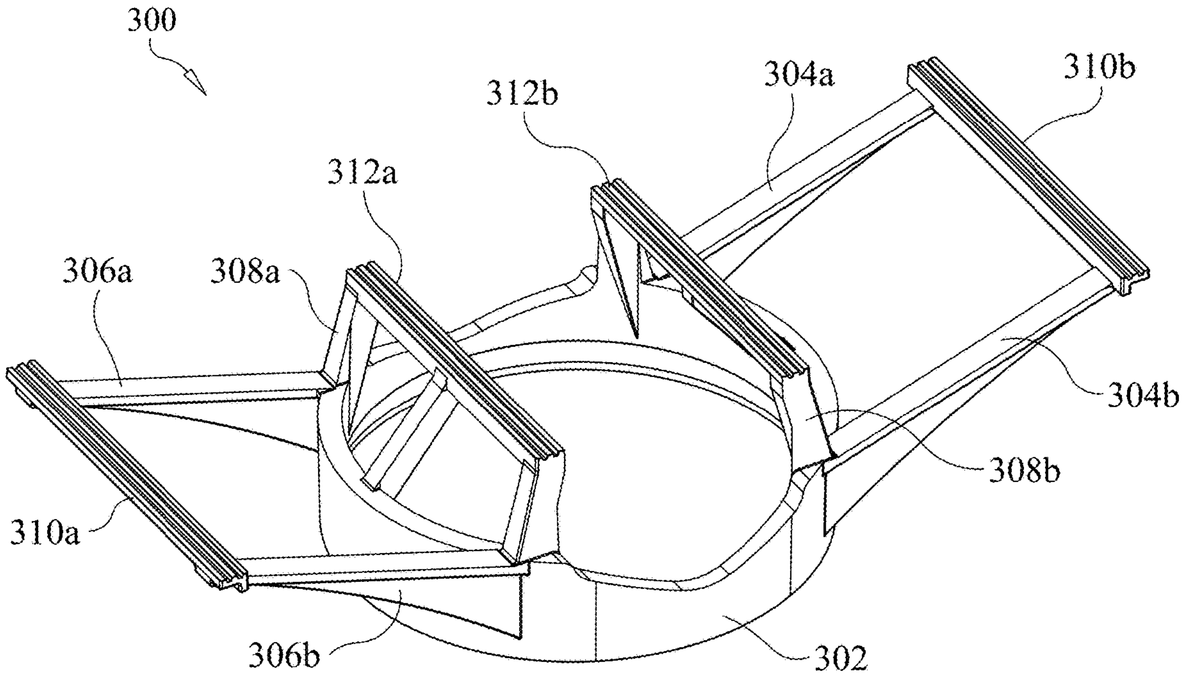
FIG. 3A is a top perspective view of a modal coupler in an embodiment.

FIG. 3A is a top perspective view of a modal coupler 300 in an embodiment. In this illustrated embodiment, a shaped central body 302 for receiving a motor drive unit is seen from which a plurality of connecting arms extend both from an outer surface of the central body 302 and an upper end of the central body 302. In particular, a first plurality of connecting arms 304*a*, 304*b* are shown extending from an outer surface of the central body 302 and having a coupling foot 310*b* which connects the two extending arms 304*a*, 304*b* and also connects to an inner surface of a diaphragm.

In this embodiment, the coupling foot 310*b* includes a series of ridges and grooves for enhanced connection to a diaphragm. Opposite the first plurality of connecting arms is a second plurality of connecting arms 306*a*, 306*b* and a second coupling foot 310*a*. A plurality of inner connecting arms 308*a* and 308*b* extend nearly vertically from an upper end of the central body 302. These inner connecting arms 308*a*, 308*b* also include coupling feet 312*a*, 312*b* which connect directly onto an inner surface of a diaphragm.

Figure 3B:
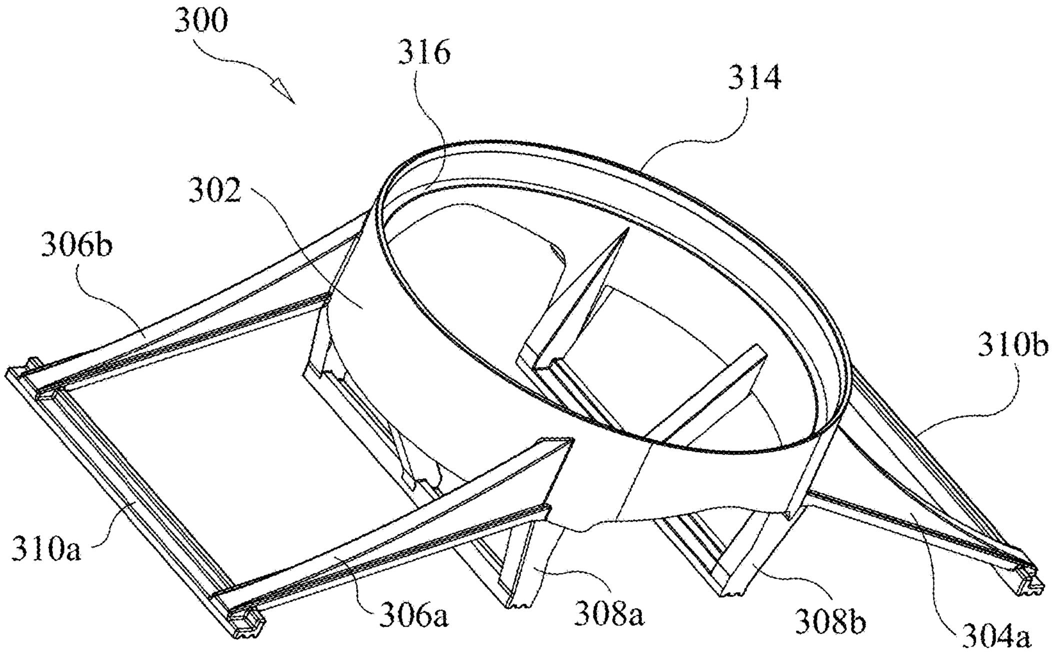
FIG. 3B is a bottom perspective view of a modal coupler in an embodiment.

FIG. 3B is an illustration of the underside of a modal coupler 300 in an embodiment. In this embodiment, a receiving area on the underside of the central body 302 for receiving a motor drive unit is shown with a receiving lip 314 for receiving and centering a voice coil former having a similar shape as the receiving area shown on this lower end of the modal coupler 302. In addition, a mounting surface 316 is provided to serve as a base after insertion of a voice coil former. In this illustrated embodiment, the outward extending connecting arms are shown extending directly from the shaped central body 302 on both sides, and the inner connecting arms 308*a*, 308*b* are shown extending nearly vertically from the opposite end of the central body.

In this embodiment, the outward arms 304*a*, 304*b*, 306*a*, 306*b* are designed such that the coupling feet connect to a diaphragm at the nodal lines of the first longitudinal bending mode of a free diaphragm which occur at locations 0.225×L in from each end of the diaphragm where L is the length of the diaphragm. The angle that the connecting arms make to the diaphragm is an important though not exclusive criterion. The outer set of connecting arms 304*a*, 304*b*, 306*a*, 306*b* intersect the diaphragm at a relatively shallow angle that is typically, but not exclusively, in the range of approximately 10° to 40° relative to the inner surface of the diaphragm, whereas the inner set of connecting arms 308*a*, 308*b* intersect the diaphragm at a relatively steep angle typically, but not exclusively, in the range of approximately 60° to 90° relative to the inner surface of the diaphragm.

The two sets of arms perform different functions that are aided by these angles. First, the inner arms 308*a*, 308*b* are responsible for conveying a portion of the low and mid frequency energy, and most of the high frequency energy into the diaphragm. Therefore, a short, direct pathway is preferred with steep angle of approach to the diaphragm to reduce bending of these arms as any significant bending of these arms will reduce the high frequency energy transmitted to the diaphragm. Second, the outer arms 304*a*, 304*b*, 306*a*, 306*b* are responsible for conveying a portion of the low and mid frequency energy to the diaphragm, and significantly less of the high frequency energy. This intentionally reduced conveyance of high frequency energy is due to the design intention that these outer arms gradually decouple from the diaphragm above the frequency of the first bending mode of the diaphragm. A preferred location for the connecting of the inner coupling feet 312*a*, 312*a* shown in FIG. 3A to the diaphragm is approximately 0.15×L. This position ensures excitation of the third and fifth bending modes although the degree to which these modes are excited may be tuned by adjusting this location. In operative embodiments, typical solutions result in this location being in the range of 0.12×L to 0.2×L. Note that 0.185×L is also an acceptable average nodal location that may also be used where the reference to "average nodal location" refers to the average of the positions of nodes for excited bending modes on a vibrating diaphragm.

An important design element is the selection of an appropriate material for a modal coupler, with associated Young's modulus and mass density being the most critical material properties for the modal coupler 300. A structural geometry and Young's modulus is chosen such that an eigenfrequency analysis of the modal coupler 300 results in the modal coupler's first bending mode frequency occurring slightly above the first bending mode frequency of the diaphragm. This is not a final choice but a starting point for iterative fine-tuning that follows. This starting point will allow the modal coupler outer connecting arms 304*a*, 304*b*, 306*a*, 306*b* to smoothly decouple from the diaphragm at the higher frequencies. It also prevents lower frequency modal coupler modes from degrading the frequency response of the drive unit. If the modal coupler 300 is too "soft," significant modal coupler bending modes could adversely affect the frequency response of the drive unit. In contrast, a modal coupler 300 that is too rigid will overly restrain the diaphragm's modal movement resulting in a piston-like radiator. As a result, although the on-axis response may not be strongly affected, the off-axis acoustic radiation will be degraded.

Figure 4:
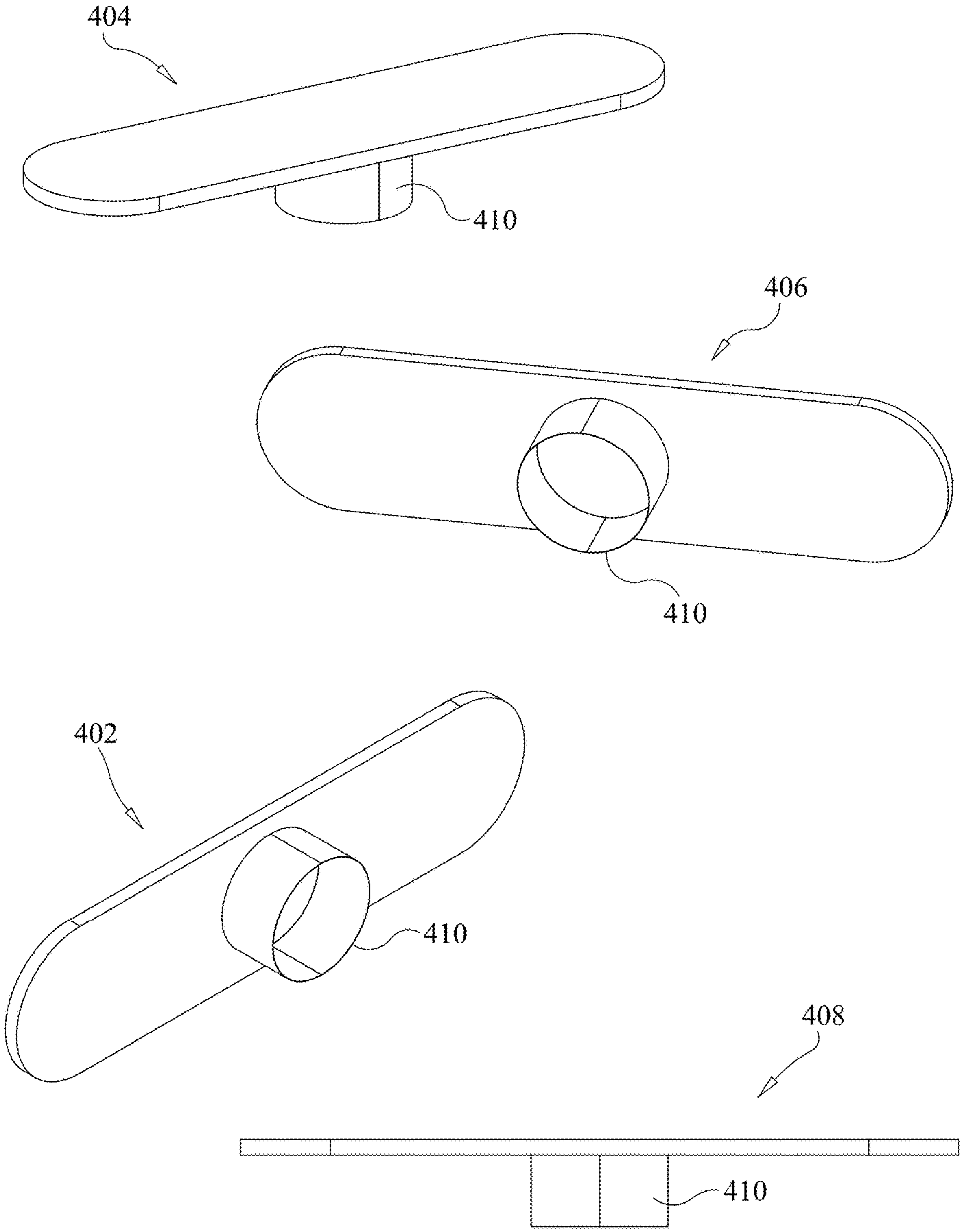
FIG. 4 is an illustration of a prior art voice coil former connected to a diaphragm in an embodiment.

FIG. 4 illustrates a prior art embodiment of a voice coil former 410 connected onto a diaphragm in an embodiment. In the first illustrated embodiment 402, the underside of the diaphragm having a connected voice coil former 410 is shown. An upper view 404 is illustrated showing the voice coil former connected to the underside of a race track shaped diaphragm. A third underside view 406 shows the voice coil former 410 connected to an inner surface of the diaphragm. An alternative view 408 provides a cross-sectional illustration of a diaphragm connected to a voice coil former 410. In this embodiment, it should be noted that the driving force produced from the electromagnetic motor used in this configuration is driven into the diaphragm directly through the coil former which does not couple optimally to the bending modes of the diaphragm and as a result does not achieve optimal radiation of acoustic signals.

Figure 5:
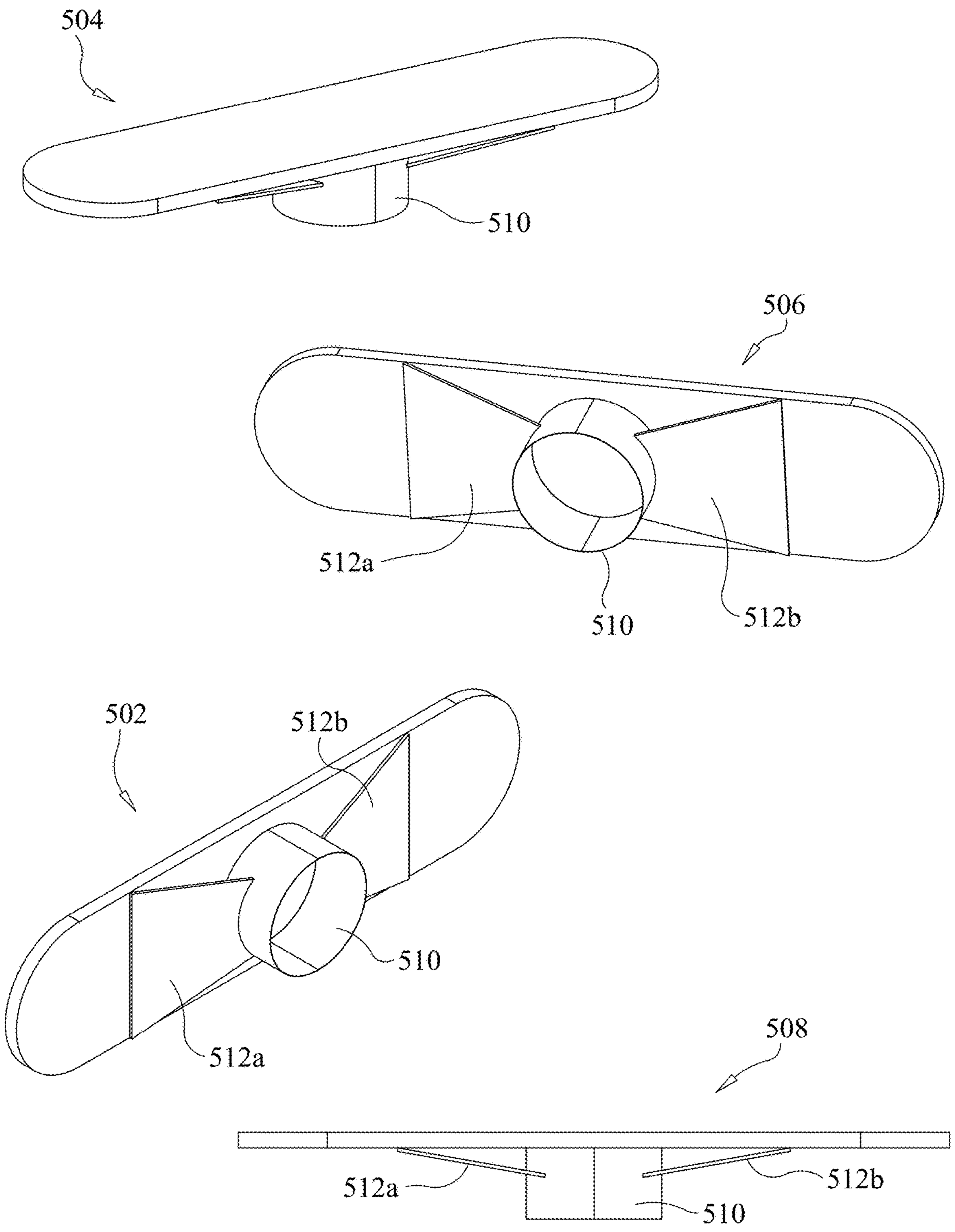
FIG. 5 is an illustration of a prior art voice coil former with a bowtie coupler connected to a diaphragm in an embodiment.

FIG. 5 illustrates another prior art embodiment showing a cylindrical voice coil former 510 directly connected to a diaphragm with a bowtie shaped coupler 512*a*, 512*b* that connects the voice coil former to an outer region of the diaphragm. In an alternative view 504, an outer surface of the diaphragm is shown with the voice coil former 510 and a bowtie coupler coupled to the inner surface of the diaphragm. A third view 506 is shown of the voice coil former 510 directly connected onto the inner surface of a racetrack shaped diaphragm and having a bowtie shaped coupler 512*a*, 512*b*. Perspective view 508 illustrates the voice coil former directly connected to the underside of a diaphragm and the bowtie shaped coupler 512*a*, 512*b* extending from the voice coil former 510 onto the inner surface of the diaphragm. Despite the use of a bowtie coupler 512*a*, 512*b*, this embodiment of a prior art arrangement does not achieve optimal radiation of acoustic signals.

Figure 6:
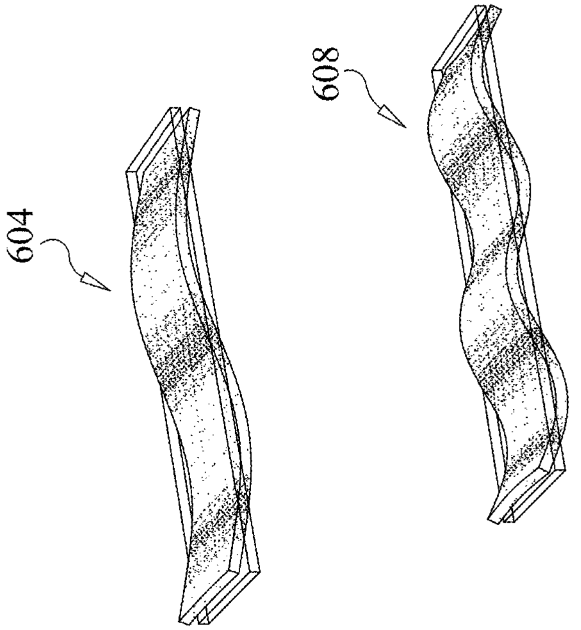
FIG. 6 is a set of illustrations depicting longitudinal bending modes in a vibrating high aspect ratio diaphragm in an embodiment.
Figure 6:
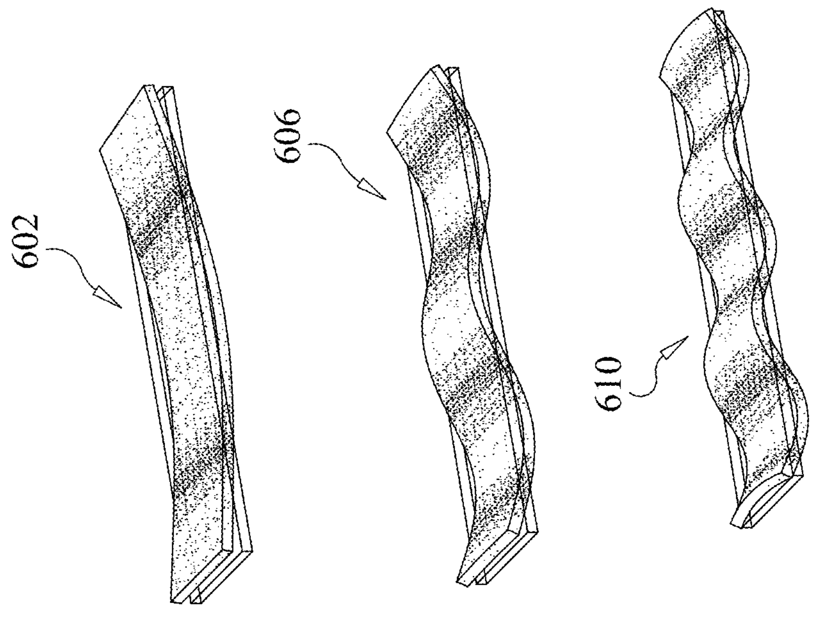

FIG. 6 is a representative set of illustrations depicting the longitudinal bending modes present in a vibrating "high aspect ratio" diaphragm of a bending mode radiator. A diaphragm is considered to have a high aspect ratio when one dimension of a two-dimensional radiating area of a diaphragm is substantially longer than the other dimension. In an embodiment, a high aspect ratio diaphragm is one in which a length to width ratio is at least 2.5:1, although in alternative embodiments this ratio can be substantially greater. Table 612 shows the number of nodal lines present for each longitudinal bending mode in an excited high aspect ratio diaphragm. An important goal in transducer design is to minimize or prevent rocking motion of the diaphragm since such motion can cause a coupled voice coil to interfere with the motor metalwork and magnets, creating audible distortion and damage to the voice coil, ultimately leading to the failure of the voice coil. As a result, it is common practice in transducer design to drive and suspend the diaphragm in a symmetrical manner that resists promotion of any rocking motion. Driving a modal high aspect ratio diaphragm with such a symmetrical arrangement means that the asymmetric bending modes of the diaphragm will not be excited. In the case of the longitudinal bending modes of the diaphragm shown in FIG. 6 only the odd order bending modes are excited as these are symmetrical about the center of the diaphragm. The even order bending modes of the diaphragm are not excited, as these would require a non-symmetric driving force arrangement, and this is highly undesirable due to its promotion of rocking modes as described. A first longitudinal bending mode 602 shows the presence of two nodal lines graphically. In a high aspect ratio diaphragm, this first bending mode is excited since the vibrational behavior of this mode is symmetric about the center of the diaphragm. The second longitudinal bending mode 604 shows the presence of three nodal lines graphically but it is not excited in a high aspect ratio diaphragm since the vibrational behavior of this mode is asymmetric about the center of the diaphragm. The third longitudinal bending mode 606 shows the presence of four nodal lines graphically and is excited since its vibrational behavior of this mode is symmetric about the center of the diaphragm. The fourth longitudinal bending mode 608 shows the presence of five nodal lines and is not excited in a high aspect ratio diaphragm since the vibrational behavior of this mode is asymmetric about the center of the diaphragm. A fifth longitudinal bending mode 610 is illustrated and shows the presence of six nodal lines that are excited in a high aspect ratio diaphragm since the vibrational behavior of this mode is symmetric about the center of the diaphragm.

Figure 7:
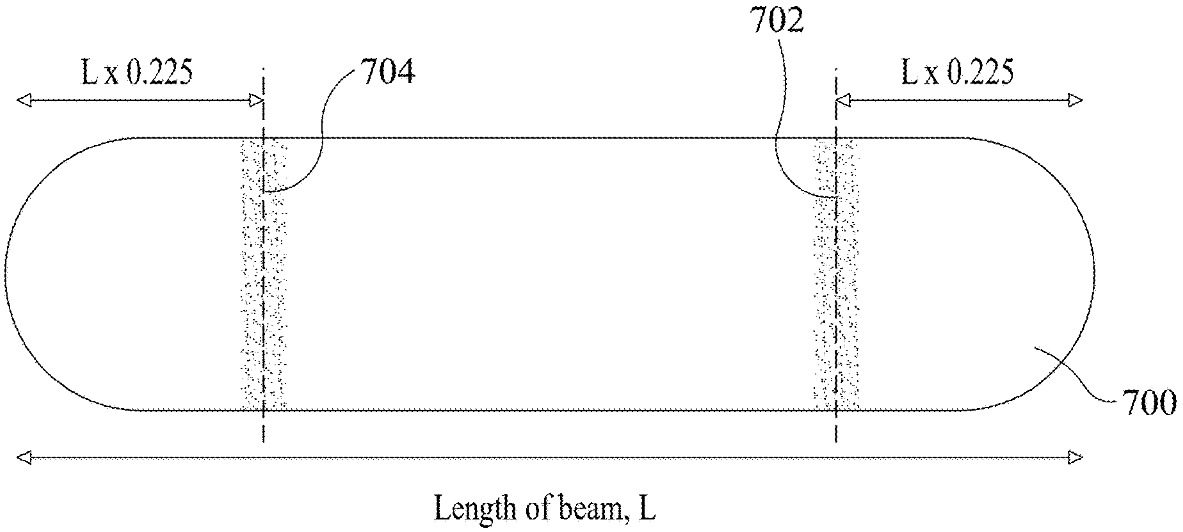
FIG. 7 is an illustration of a racetrack shaped diaphragm in an embodiment

FIG. 7 is an illustration of a racetrack shaped diaphragm 700 in an embodiment. This illustration shows the position of the nodal lines for the first longitudinal bending mode of an active high aspect ratio diaphragm. The depicted nodal lines 702 and 704 are shown graphically to help visualize their location along the extended length of a diaphragm. The nodal lines for the first longitudinal bending mode occur on or near locations that are approximately 0.225×L from each end of a diaphragm, where Lis the length of a diaphragm, or equivalently the location of the nodal lines span a width that is approximately equal to 0.55×L about the center of the diaphragm.

Figure 8B:
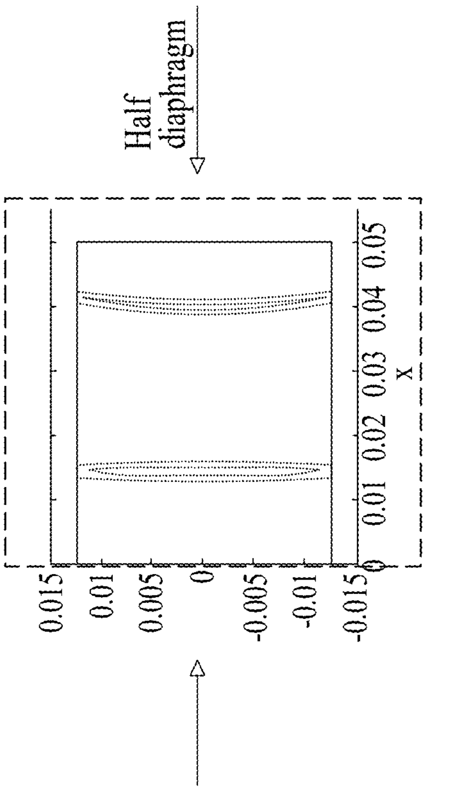
FIG. 8B is an illustration showing the location of nodal lines on one-half of a diaphragm in an embodiment.
Figure 8A:
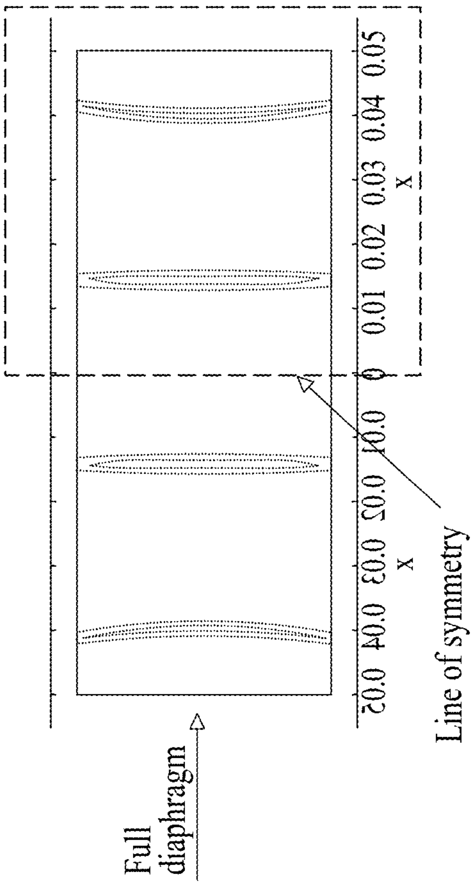
FIG. 8A is an illustration showing the location of nodal lines on a full rectangular-shaped diaphragm in an embodiment.

FIG. 8A illustrates the location of nodal lines across a full diaphragm when a diaphragm is rectangular in shape. This figure also illustrates where a line of symmetry is located around which the nodal lines are equidistant on both sides of the diaphragm. FIG. 8B is an illustration showing the location of nodal lines on one-half of a diaphragm. These illustrations will used to interpret the plots in FIGS. 9 through 11.

Figure 9:
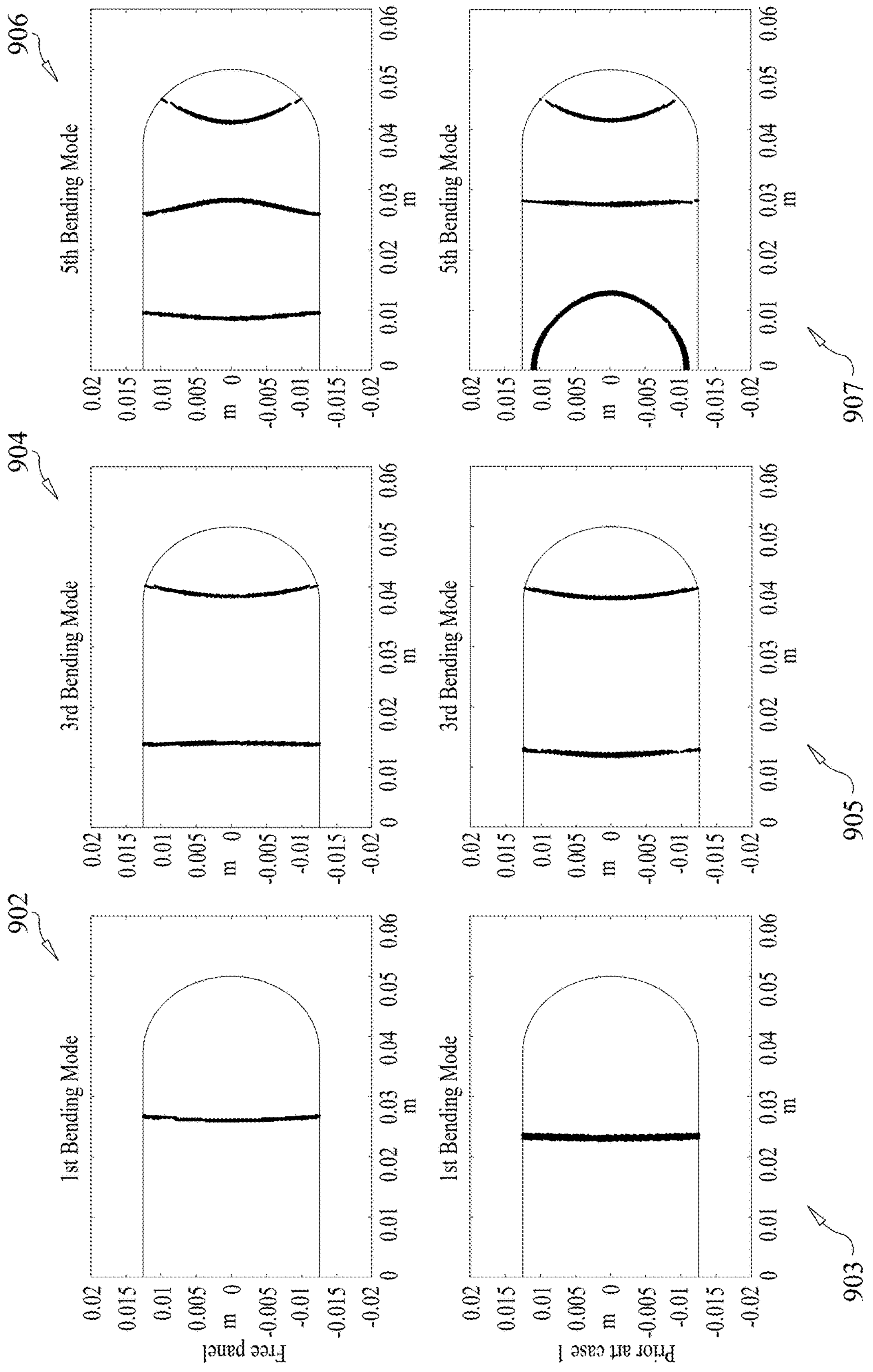
FIG. 9 is a graphic illustration of the location of nodal lines for excited bending modes in a prior art high aspect ratio diaphragm in an embodiment.

FIG. 9 illustrates graphically the location of nodal lines for the first longitudinal bending mode, the third longitudinal bending mode, and the fifth longitudinal bending mode, each of which are excited in high aspect ratio diaphragms. The plots are shown to help visually compare the location of nodal lines as they appear on the ideal free panel (or diaphragm) relative to their locations on the diaphragms used in the first prior art case, the second prior art case, FIG. 10, and on the diaphragm on which a modal coupler is used, FIG. 11, which were previously illustrated in FIGS. 2, 4 and 5. In each of FIGS. 9, 10, and 11, the nodal line structure of the theoretical free diaphragm is presented as the ideal reference case. In practice, a design objective for a BMR, whether circular, square, or high aspect ratio rectangular or racetrack shaped, is to recover the ideal bending mode shapes of the free diaphragm. These ideal bending mode shapes become unbalanced by the mass of a force input structure, such as a voice coil assembly, when added to a diaphragm. In each case presented in FIGS. 9, 10, and 11, the nodal line structure of each bending mode of a particular structural case is compared to the nodal line structure of the ideal free diaphragm. The closer the nodal line structure of a particular structural case approximates the nodal line structure of the free diaphragm, the closer its acoustic performance will approximate that of the ideal free diaphragm. In FIG. 9 the location of the nodal line for the first longitudinal bending mode on a free panel or diaphragm is shown in plot 902. The location of the nodal line of the first longitudinal bending mode for the first prior art case is shown in plot 903. Note the relative similarity in position between the free panel case and the first prior art case. Continuing, plot 904 shows the location of nodal lines for the third longitudinal bending mode on a free panel and plot 905 shows the location of the nodal lines for the third longitudinal bending mode for the first prior art case. Again, note the relative similarity in locations. However, the direction of curvature of the inner-most nodal line at this third bending mode is different between the free panel and the first prior art case, where in the free panel case this nodal line curves towards the end of the panel, and in the first prior art case this nodal line curves towards the center of the panel. Plot 906 illustrates the location of nodal lines of the fifth longitudinal bending mode on a free high aspect ratio diaphragm. Plot 907 shows the locations of nodal lines for the fifth longitudinal bending mode on a high aspect panel for the first prior art case. Note the substantial degradation in the locations and shapes of the nodal lines for this fifth bending mode which shows that at higher bending mode frequencies the first prior art case will tend to distort the radiation of acoustic signals away from the desired behavior of the free panel case.

Figure 10:
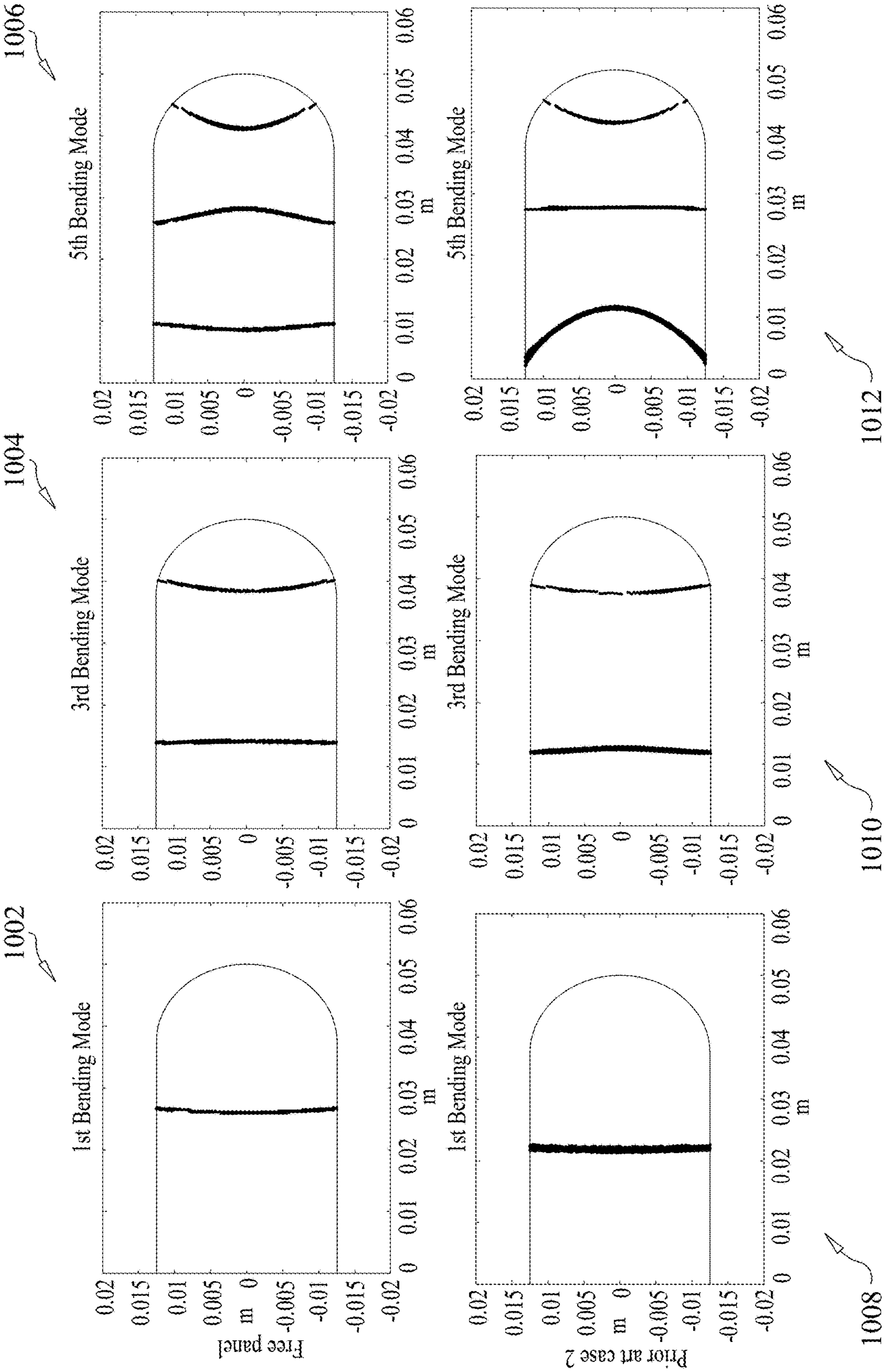
FIG. 10 is a graphic illustration of the location of nodal lines for excited bending modes in a prior art high aspect ratio diaphragm in an embodiment.

FIG. 10 illustrates graphically the location of nodal lines for the first longitudinal bending mode, the third longitudinal bending mode and the fifth longitudinal bending mode, each of which are excited in high aspect ratio diaphragms. The plots are shown to help visually compare the location of nodal lines as they appear on the ideal free panel (or diaphragm) relative to their locations on the diaphragm used in the second prior art case. The location of the nodal line for the first longitudinal bending mode on a free panel (or diaphragm) is shown in plot 1002. The location of the nodal line of the first longitudinal bending mode for the second prior art case is shown in plot 1008. Note the relative similarity in position and shape between the free panel case and the second prior art case. Continuing, plot 1004 shows the location of nodal lines for the third longitudinal bending mode on a free panel and plot 1010 shows the location of the nodal lines for the third longitudinal bending mode for the second prior art case. Again note the relative similarity in shape and locations. Plot 1006 illustrates the location of nodal lines of the fifth longitudinal bending mode on a free high aspect ratio diaphragm. Plot 1012 shows the locations of nodal lines for the fifth longitudinal bending mode on a high aspect ratio panel (or diaphragm) for the second prior art case. Note the substantial degradation in the shapes and locations of the nodal lines for this fifth bending mode which shows that at higher bending mode frequencies the second prior art case will tend to distort the radiation of acoustic signals away from the desired behavior of the free panel case.

Figure 11:
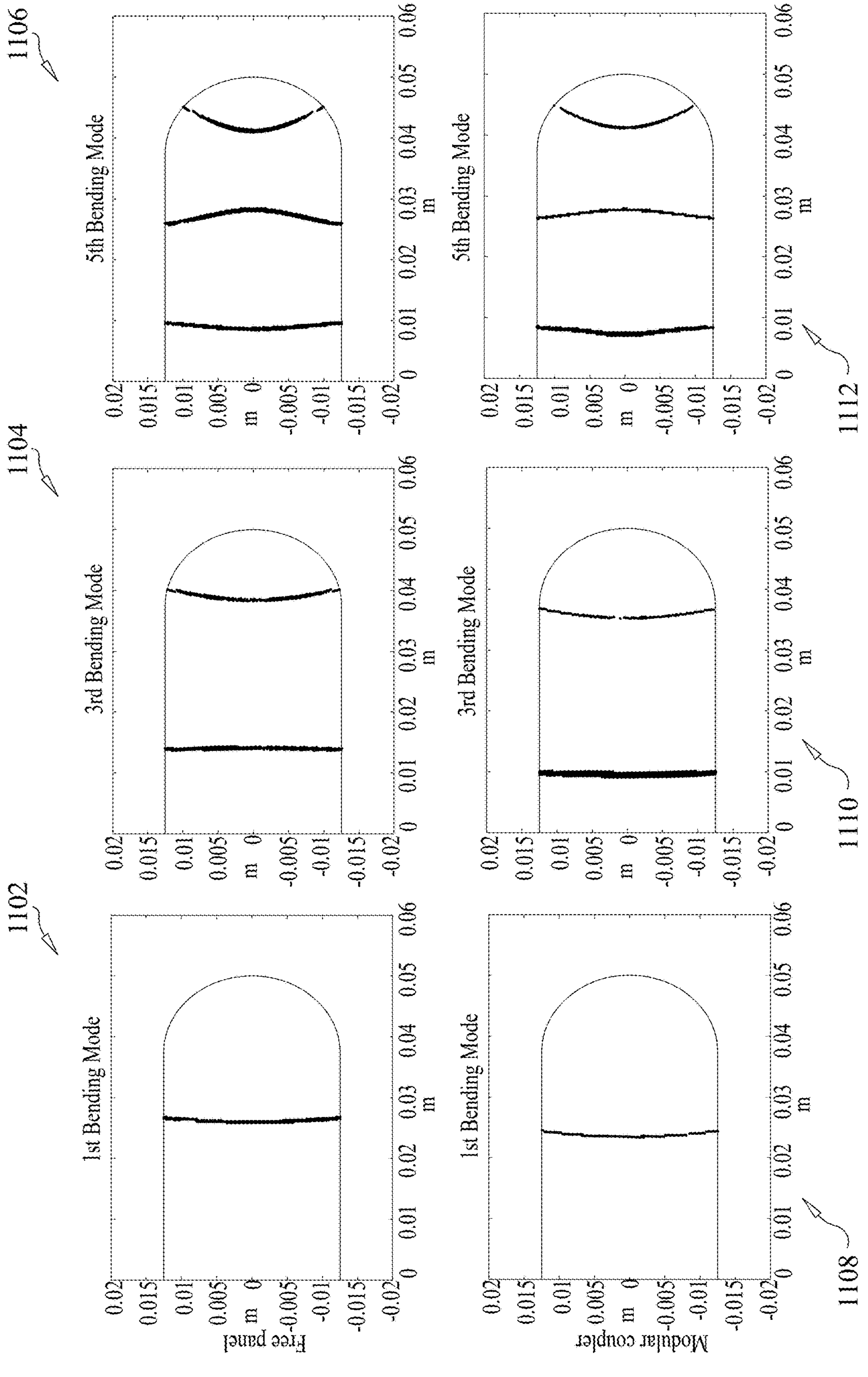
FIG. 11 is a graphic illustration of the location of nodal lines for excited bending modes in a high aspect ratio diaphragm using a modal coupler in an embodiment.

FIG. 11 illustrates graphically the location of nodal lines for the first longitudinal bending mode, the third longitudinal bending mode and the fifth longitudinal bending mode, each of which are excited in high aspect ratio diaphragms. The plots are shown to help visually compare the location of nodal lines as they appear on the ideal free panel (or diaphragm) relative to their locations on the diaphragm used with a modal coupler. The location of the nodal line for the first longitudinal bending mode on a free panel (or diaphragm) is shown in plot 1102. The location of the nodal line of the first longitudinal bending mode for diaphragm on which a modal coupler is connected is shown in plot 1108. Note the relative similarity in shape and position between the free panel case and the modal coupler case. Continuing, plot 1104 shows the location of nodal lines for the third longitudinal bending mode on a free panel and plot 1110 shows the location of the nodal lines for the third longitudinal bending mode for the modal coupler case. Again, note the relative similarity in shape and locations. Plot 1106 illustrates the location of nodal lines of the fifth longitudinal bending mode on a free high aspect ratio diaphragm. Plot 1112 shows the locations of nodal lines for the fifth longitudinal bending mode on a high aspect ratio panel (or diaphragm) for the modal coupler case. Note the substantial similarity in the shape and locations of the nodal lines for this fifth bending mode on both the "free panel" case and the modal coupler case, which shows that even at higher bending mode frequencies a high aspect ratio diaphragm with a modal coupler will tend to preserve the desired radiating properties of acoustic signals similar to those of the free panel.

Figure 12:
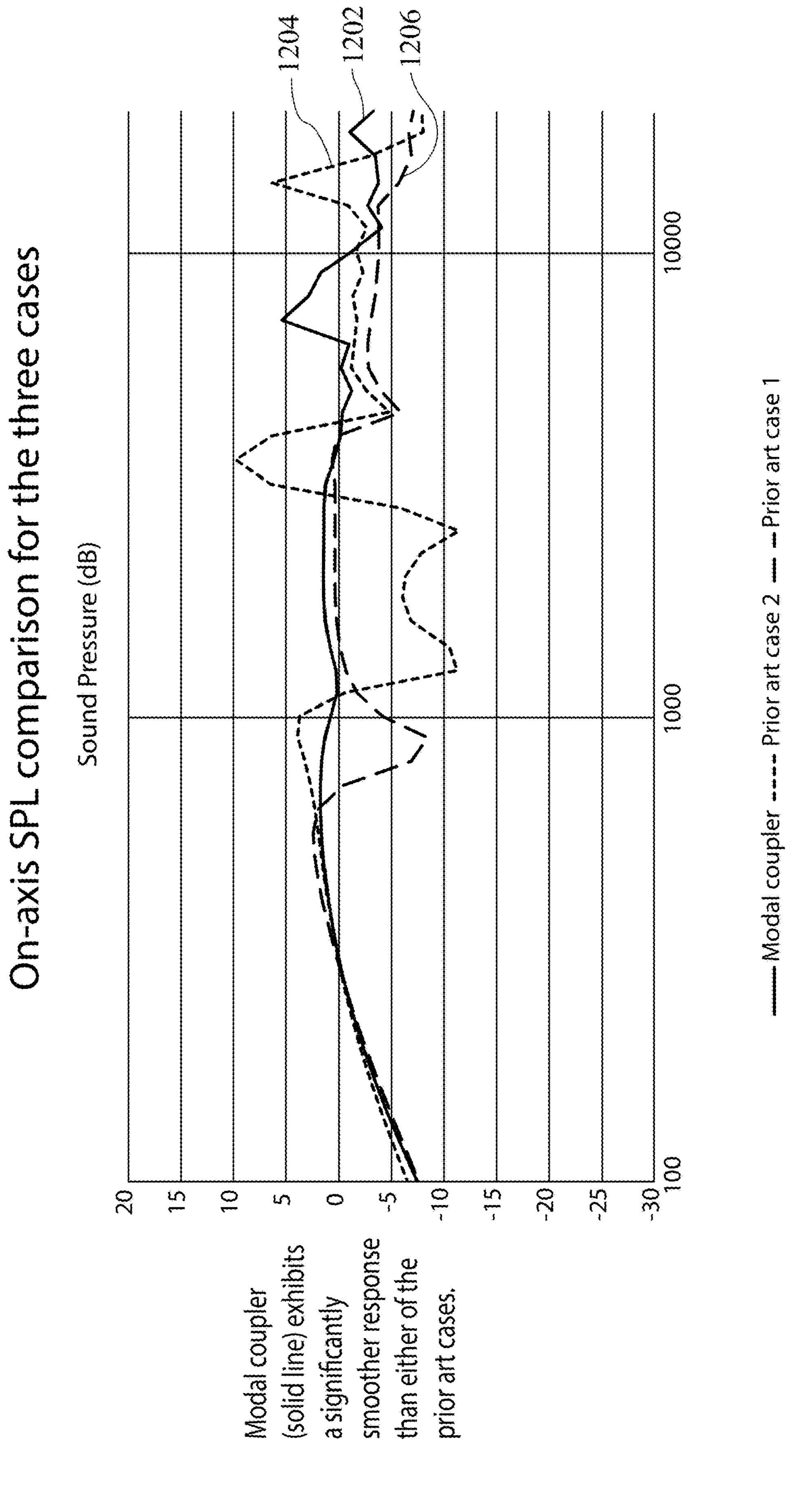
FIG. 12 is an illustration of comparative on-axis sound pressure level responses for the diaphragms shown in FIGS. 9, 10 and 11.

FIG. 12 is an illustration showing the comparative on-axis sound pressure level responses provided by each of the three cases which have been compared previously. As is evident from the graph, prior art case one shows significant drops in sound pressure at acoustically important locations (see graph line 1206). Likewise, the on-axis sound pressure level provided from the second prior art case shows even more significant degradation over the acoustically important range (see graph line 1204). However, the diaphragm having a modal coupler connected shows a significantly smoother response for on-axis sound pressure level over the acoustically significant range (see graph line 1202).

Figure 13:
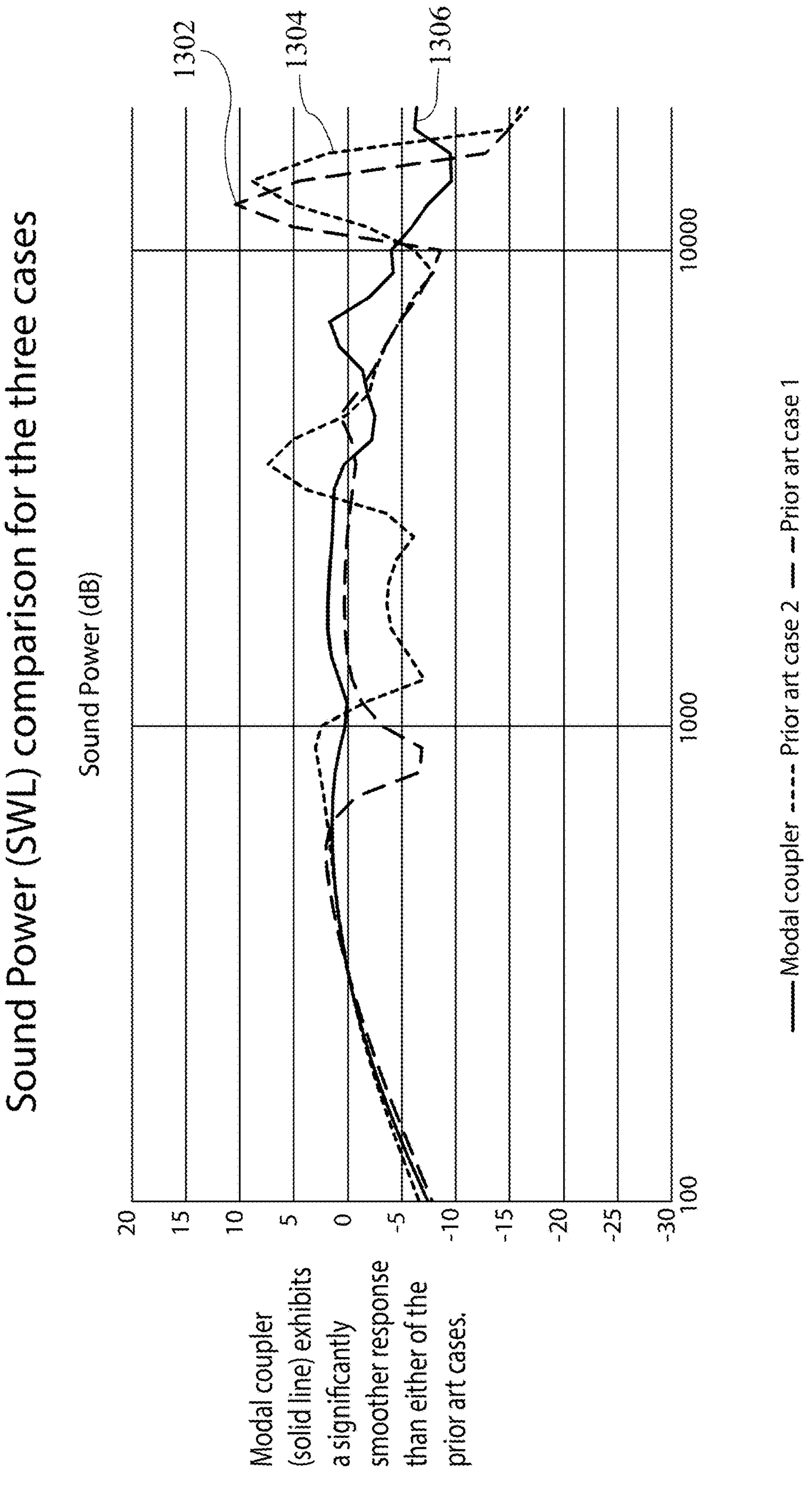
FIG. 13 is an illustration of comparative sound power level responses for the diaphragms shown in FIGS. 9, 10 and 11.

FIG. 13 is an illustration showing the comparative sound power level responses in decibels (referred to as "SWL") for each of the three cases compared previously. Again, the diaphragm having a directly connected voice coil former, as illustrated in FIG. 4, exhibits degraded sound power level response over an acoustically significant range (see graph line 1306). The sound power output from the second prior art case also shows significant degradation over the acoustically important range (see graph line 1304). The sound power output of the modal coupler exhibit significantly smoother response over the acoustically relevant range relative to the other two prior art cases (see graph line 1302) demonstrating that there are significant benefits that can be derived from the removal of a component, such as a voice coil former, from direct connection with a vibrating diaphragm and transferring a driving force through a modal coupler.

Figure 14:
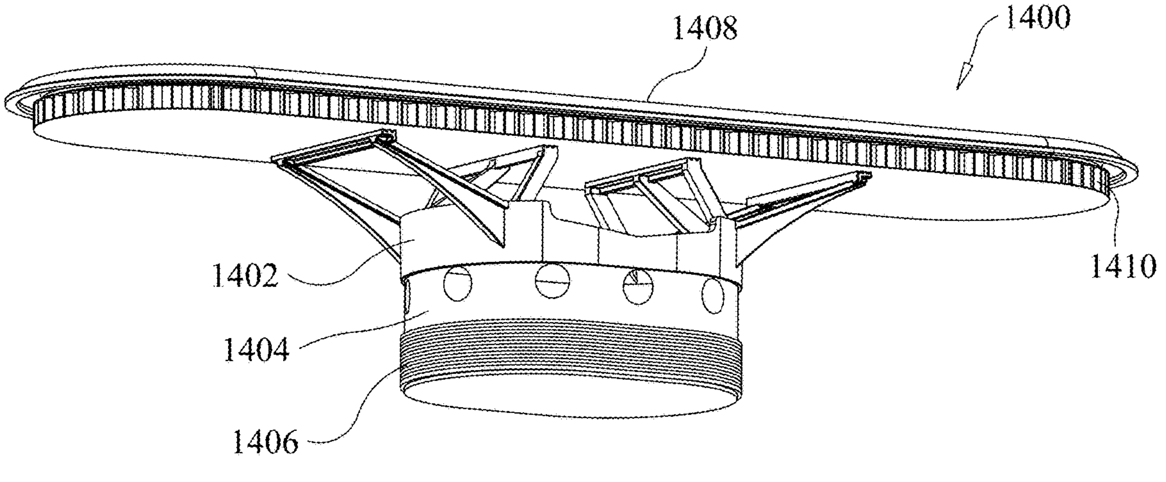
FIG. 14 is an illustration of a modal coupler having a racetrack shape in an embodiment.

FIG. 14 is an illustration of a modal coupler having an alternative shape, in this case a racetrack shape coupled to a racetrack shaped diaphragm in an embodiment 1400. On a first end, the racetrack shaped voice coil former 1404 has wound upon it a voice coil 1406. The other end the voice coil former 1404 shaped for insertion into a racetrack shaped modal coupler 1402. In operation, the driving force of the voice coil former 1404 will be transferred to and through the racetrack shaped modal coupler 1402 which will in turn transfer the driving force into the diaphragm 1410 from which acoustic signals will be radiated from an outer surface of the diaphragm 1410 around which a roll surround 1408 is located on the perimeter of the diaphragm 1410. As shown in this embodiment, diaphragm 1410 is comprised of a composite honeycomb core structure sandwiched between thin skins. Although a beneficial structural material, alternative structural materials can be used in the diaphragm 1410 while still preserving the enhanced radiative properties provided from use of a modal coupler.

Figure 15:
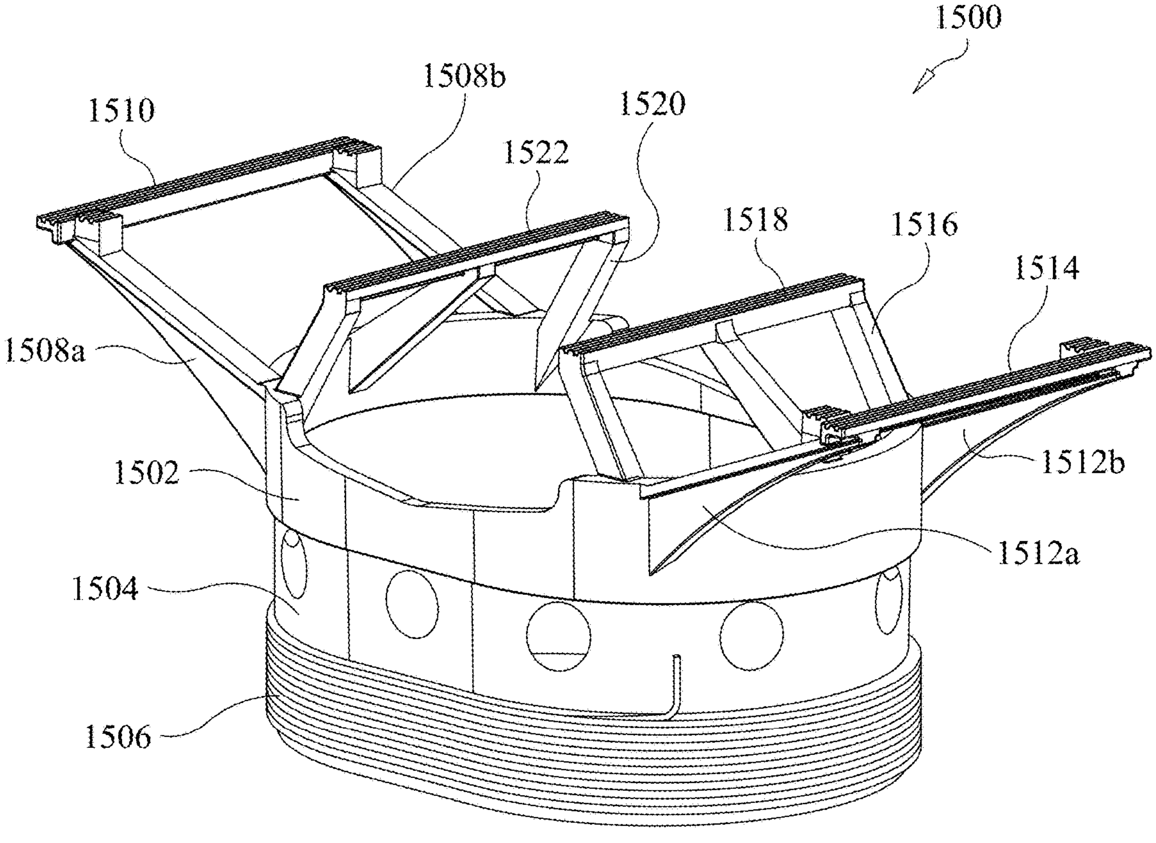
FIG. 15 is an illustration of a modal coupler having a racetrack shape in an embodiment.

FIG. 15 is an illustration of a modal coupler having a racetrack shape in an embodiment 1500. In this embodiment, the model coupler is comprised of a shaped central body 1502, a first plurality of extended connecting arms 1508*a*, 1508*b*, 1512*a*, 1512*b* extending outward from the outer surface of the shape central body 1502 and a second plurality of connecting arms 1516, 1520 extending nearly vertically from an upper end of the shaped central body 1502. At the end of each of the connecting arms 1510, 1514, 1518, 1522 is a coupling foot having a rectilinear shape that is to be connected onto an inner surface of an acoustic diaphragm. A first end of a voice coil former 1504 having a racetrack shape is inserted into the lower end the racetrack shaped central body 1502. A voice coil is wound upon a second end of the racetrack shaped voice coil former 1504 in this embodiment. This figure illustrates one of several different shaped configurations that may be taken by the shaped central body and the corresponding shaped voice coil former depending upon the planned commercial application, product design and sizing requirements. In alternative embodiments, the shaped central body 1502 can be circular or rectangular, among other shaped configurations suitable for a given commercial application.

Figure 16:
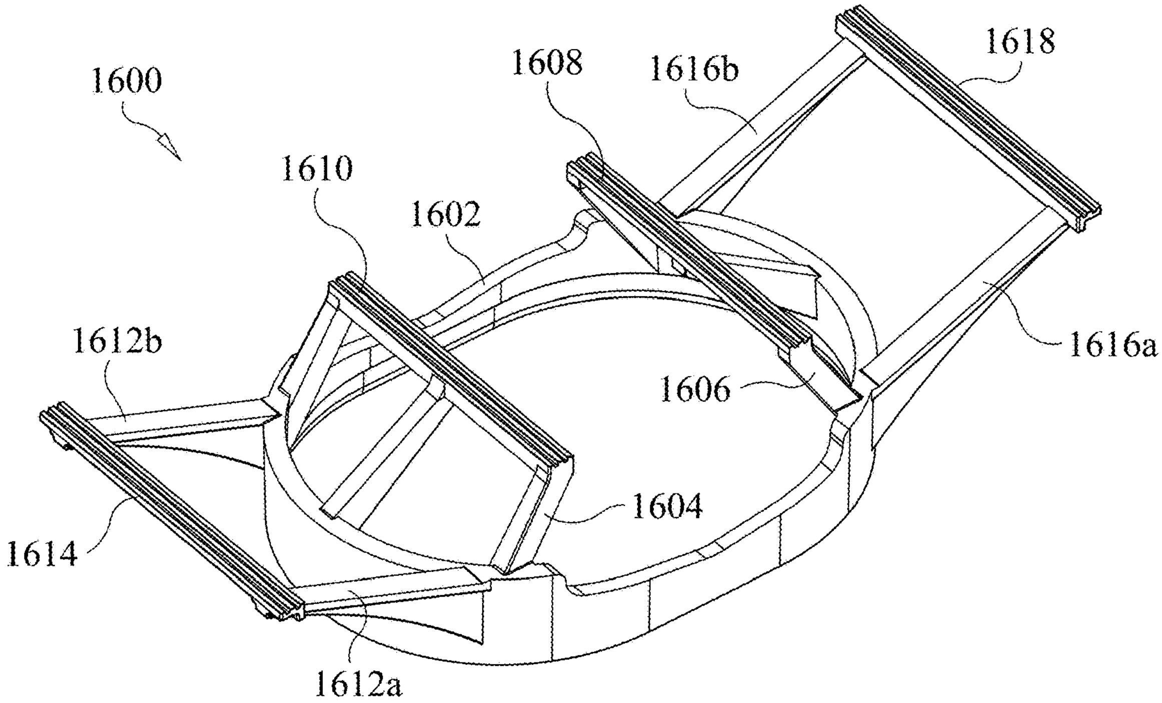
FIG. 16 is a top view of a shaped modal coupler in an embodiment.

FIG. 16 is a top view of a shaped modal coupler in an embodiment 1600. As is shown in this figure, a racetrack shaped central body 1602 provides support for several sending connecting arms. A first plurality of connecting arms 1612*a*, 1612*b*, 1616*a*, 1616*b*, extends outward from both sides of the shaped central body 1602. A second plurality of connecting arms 1604, 1606 extends from an upper end of the racetrack shaped central body 1602. Each of the first plurality of connecting arms 1612*a*, 1612*b*, 1616*a*, 1616*b* are connected to a coupling foot 1614, 1618 that connects to an inner surface of a diaphragm at a location representing the nodal line of a first bending mode. Likewise, each of the second plurality of connecting arms 1604, 1608 connects to an inner surface of the diaphragm using each of the coupling feet 1608, 1610. The outer first plurality of connecting arms 1612*a*, 1612*b*, 1616*a*, 1616*b* are responsible for transferring a portion of the low and mid frequency energy to the diagram and significantly less of the high frequency energy. The inner second plurality of connecting arms 1604, 1606 are responsible for transferring a portion of the low and mid frequency energy and most of the high frequency energy into the diaphragm.

Figure 17:
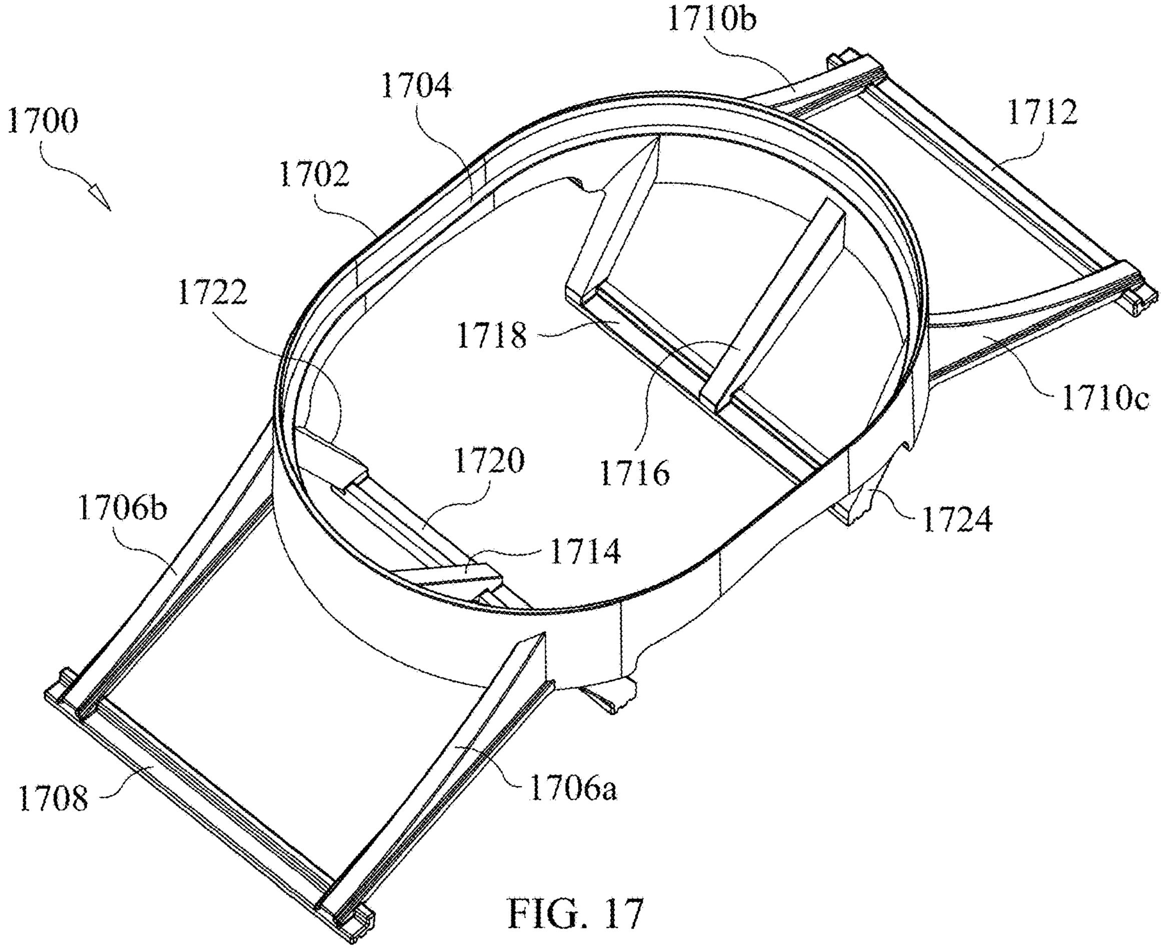
FIG. 17 is a bottom view of the shaped modal coupler in an embodiment.

FIG. 17 is a bottom view of the shaped modal coupler in an embodiment 1700. In this embodiment, the bottom receiving end of the racetrack shaped central body includes a receiving lip 1702 for centering an inserted voice coil former. This receiving end of the shaped central body also includes an extended mating area 1704 which serves as a stop for an inserted voice coil former in the shaped central body. This figure also shows the underside of the extending first plurality of connecting arms 1706*a*, 1706*b*, 1710*a*, 1710*b* and the nearly vertically extending second plurality of connecting arms 1722, 1724 including an interior set of arms

1714, 1716 provided to add reinforced support for the second plurality of connecting arms 1722, 1724. The underside of the coupling feet 1708, 1712 are also depicted extending between the first plurality of connecting arms 1706*a*, 1706*b*, 1710*a*, 1710*b* as well as the underside of the coupling feet 1718, 1720 extending across each of the second plurality of connecting arms 1722, 1724.

Figure 18A:
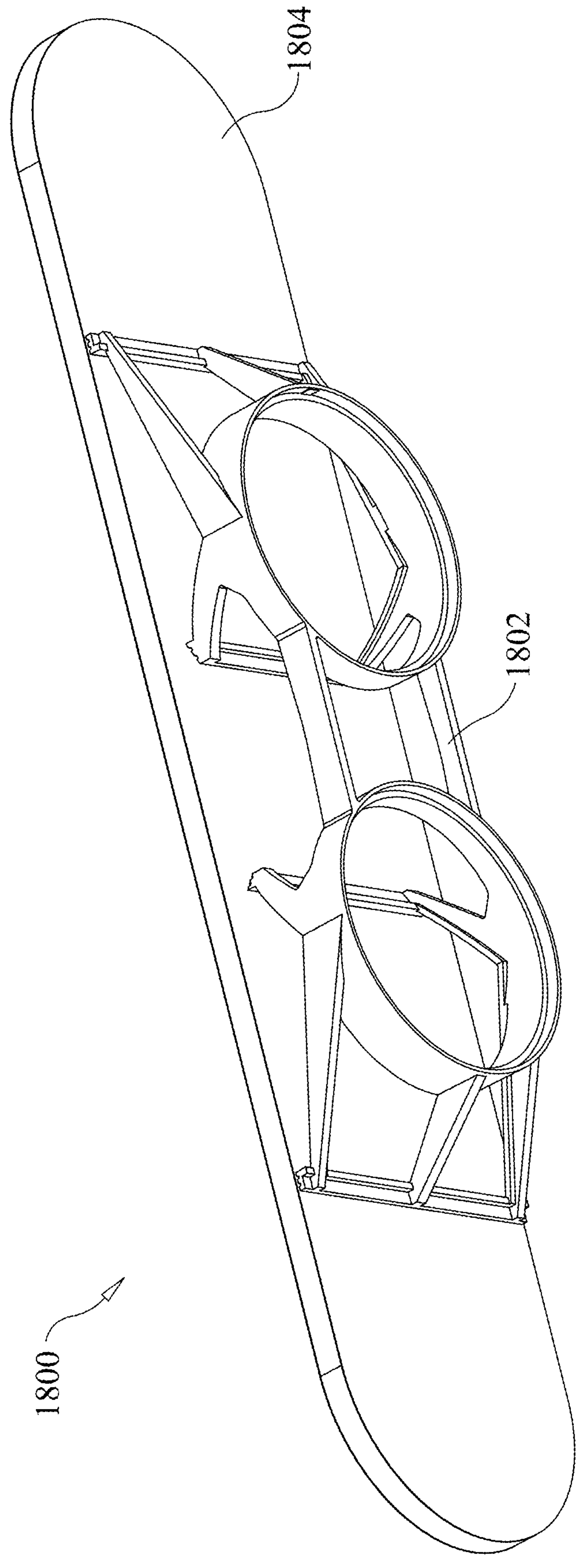
FIG. 18A is an illustration of a modal coupler having two circular shaped central bodies for receiving two motor drive units in an embodiment.

FIG. 18A is an illustration of a modal coupler comprised of two shaped and connected central bodies for receiving two motor drive units connected to a shaped diaphragm in an embodiment 1800. The two motor drive units in one embodiment are securely mounted within one motor return cup, while in an alternative embodiment each of the motor drive units are securely mounted in separate motor return cups. In this illustrated embodiment, the modal coupler 1802 is shown connected to an inner surface of a racetrack shaped diaphragm 1804. The purpose of this illustration is to show how additional motor drive units may be coupled through a single modal coupler to a diaphragm to increase the amount of driving force that can be applied to a diaphragm. Designs of this type are particularly useful in commercial applications with confined spaces for diaphragms but with an equal or greater need for high quality acoustic signal radiation.

Figure 18B:
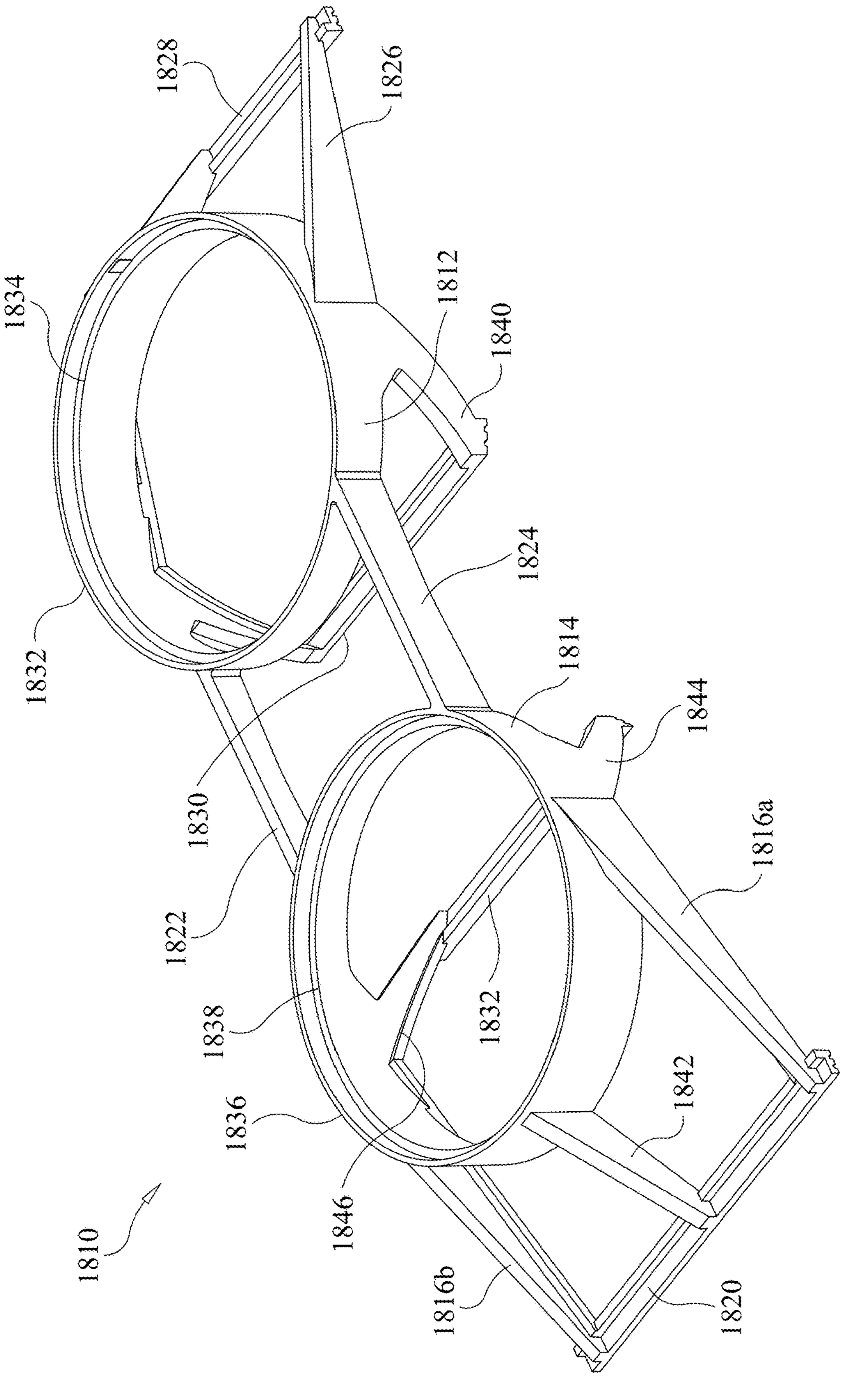
FIG. 18B is a bottom view of a modal coupler having two circular shaped central bodies for receiving two motor drive units in an embodiment.
Figure 18C:
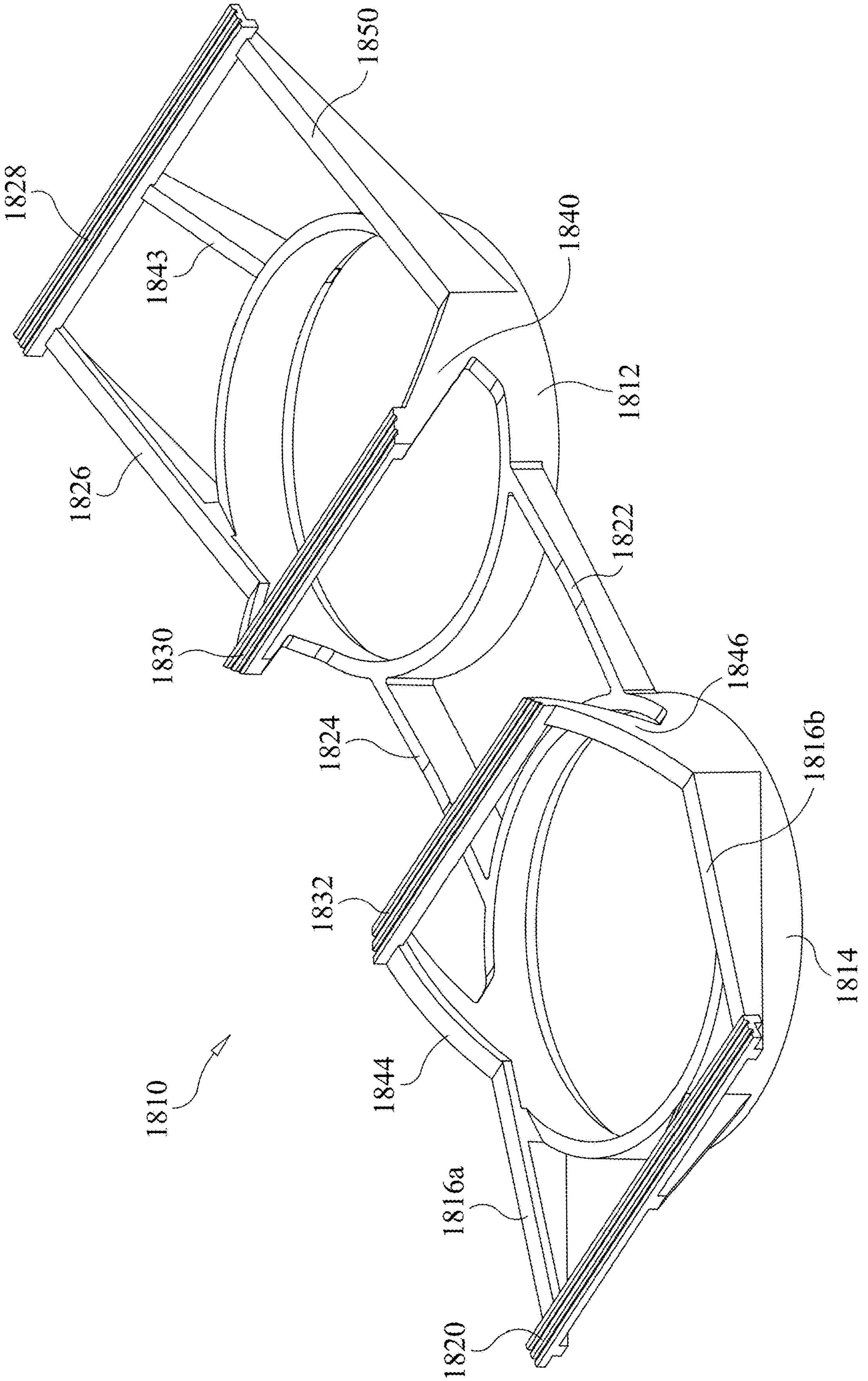
FIG. 18C is a top view of a modal coupler having two circular shaped central bodies for receiving two motor drive units in an embodiment.

FIG. 18B is an illustration of the underside of a modal coupler having two shaped central bodies 1812, 1814 in an embodiment 1810. Although the shaped central bodies 1812, 1814 are shown as circular in shape, in alternative embodiments the shaped central bodies 1812, 1814 can have a racetrack shape, a rectangular shape or other suitable shape dictated by the form and fit requirements of a commercial application. In this embodiment, it is shown that each shaped central body includes a receiving lip 1832, 1836 and a mating base 1834, 1838 for centering and securing inserted voice coil formers. Each of the modal couplers in this embodiment are connected by a plurality of centralized connecting arms 1822, 1824. This embodiment of the modal coupler also includes a plurality of inner connecting arms 1840, 1844 and a plurality of outer connecting arms 1816*a*, 1816*b*, 1826. Each of the connecting arms includes a coupling foot 1820, 1832, 1830, 1828 for securing the modal coupler onto an inner surface of an acoustic diaphragm. In addition, the outer connecting arms 1816*a*, 1816*b*, 1826 are further supported by a support truss 1842, 1846 extending from each outer surface of the shaped central bodies 1812, 1814. FIG. 18C shows the upper side of the modal coupler having two shaped central bodies 1812, 1814 for receiving shaped voice coil formers. In the illustrated embodiment, the shape of the coupling feet 1820, 1832, 1830, 1828 is rectilinear and they each include a series of ridges and grooves for securely mounting onto an inner surface of a diaphragm. These ridges and grooves provide enhanced adhesion to the inner surface of the diaphragm by providing space for the flow and expansion of a gluing compound used to secure attachment to a diaphragm.

Figure 19:
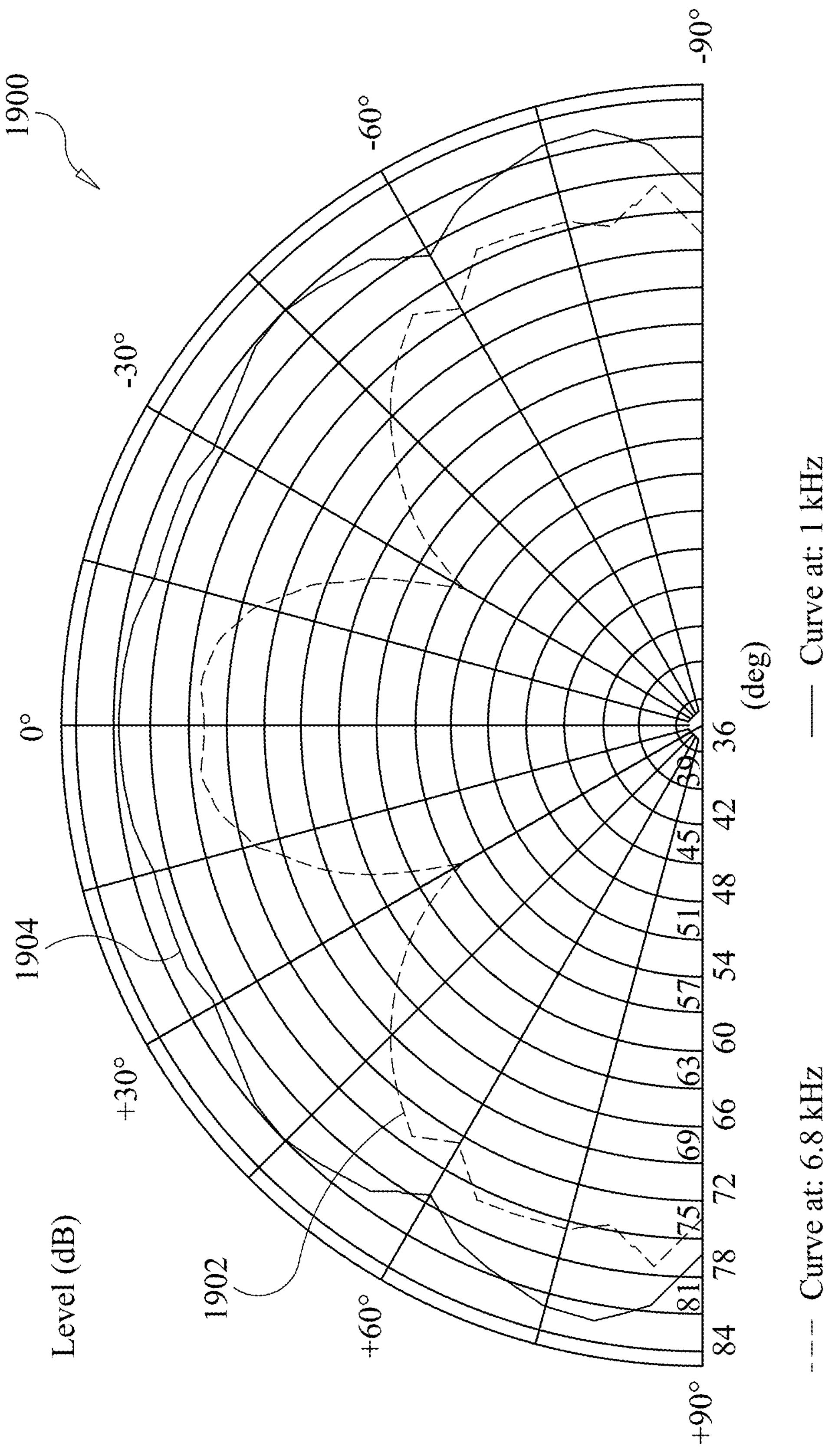
FIG. 19 is a polar measurement diagram for a prior art two-motor high aspect ratio diaphragm balanced mode radiator in an embodiment.

FIG. 19 is a polar measurement diagram 1900 for a prior art two-motor high aspect ratio balanced mode radiator drive unit. This diagram 1900 shows curves for the distribution of sound pressure levels at two different vibrational frequencies, one at 1 kilohertz (1904) and one at 6.8 kilohertz (1902). The separation distance between the two motor units in this embodiment is 50 mm. As can be seen in this diagram 1900, a broader more uniform distribution of sound pressure level occurs at 1 kilohertz, where the wavelength in air (approximately 300 mm) is significantly larger than the separation of the motors (50 mm), while acoustic beaming due to interference between radiation from each of the two motors begin to form at a vibrational frequency of 6.8 kilohertz where the wavelength in air (50 mm) is approximately the same as the spacing of the motors (50 mm).

Figure 20:
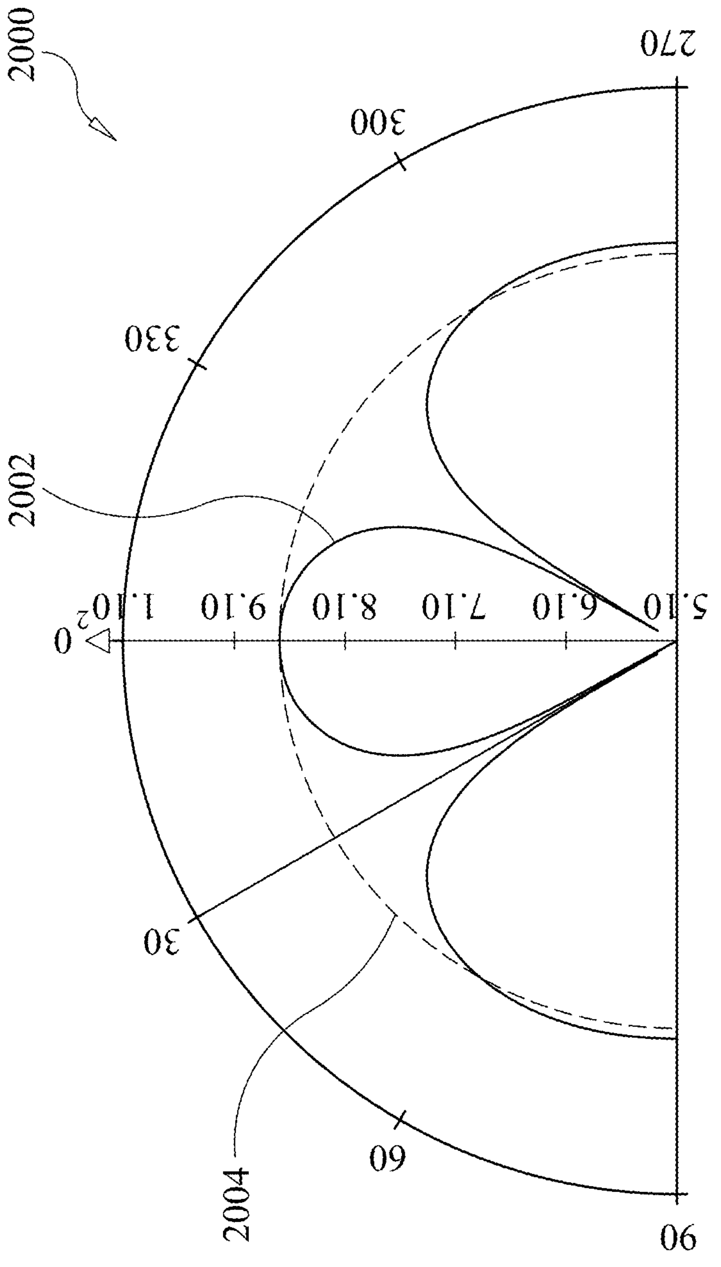
FIG. 20 is an illustration of a theoretical polar response for a two-motor drive unit transducer in an embodiment.

FIG. 20 illustrates a theoretical polar response 2000 for a prior art two-motor drive unit transducer where each drive unit is separated by 50 mm. It can be seen in this theoretical response chart that a broader and more uniform sound pressure level is present at a vibrational frequency of 1 kilohertz (see line 2004) and that an acoustic null occurs at 30° for a vibrational frequency of 6.8 kilohertz (see line 2002). This acoustic null is due to the radiation at the 6.8 kilohertz vibrational frequency from the two motor units separated by the 50 mm distance interfering in the far field.

Figure 21:
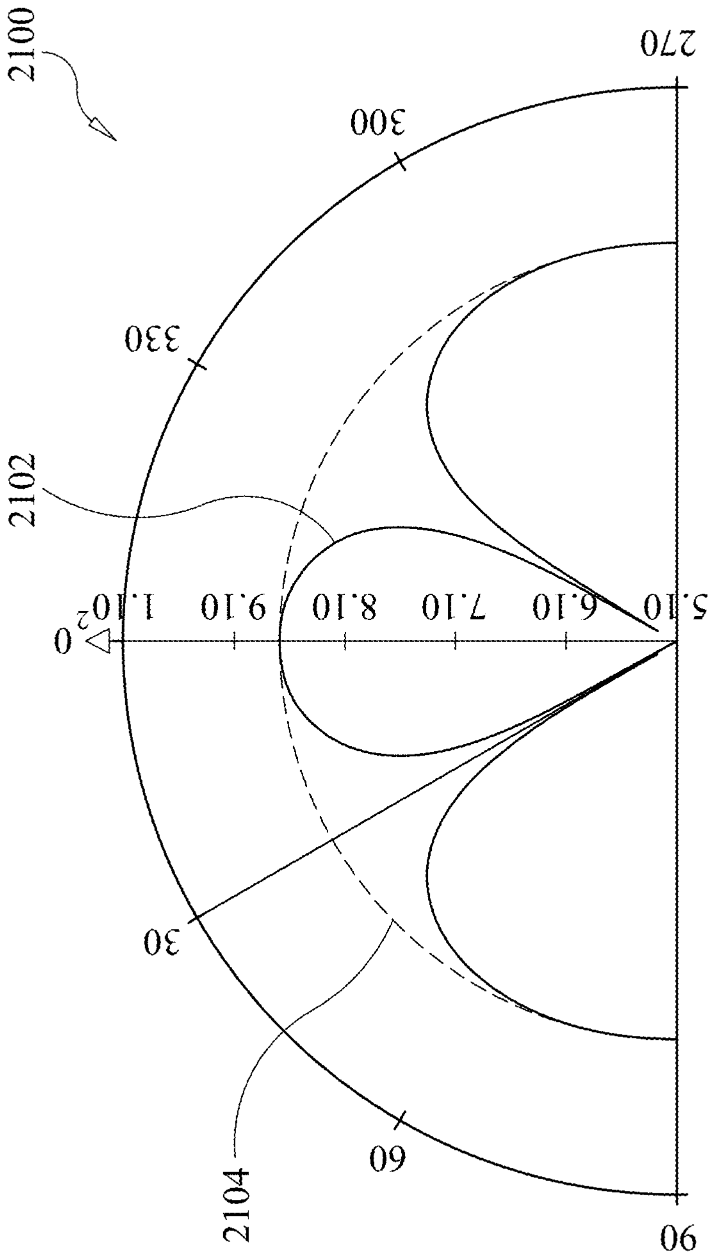
FIG. 21 is an illustration of a theoretical polar response for a two-motor drive unit transducer in an embodiment.

FIG. 21 is a polar response chart illustrating the theoretical support in a theoretical polar response for a two-motor unit structure where the motor units are coupled to the diaphragm via a modal coupler with inner feet separated by 18 mm. As shown in this polar response plot, the vibrational frequency of one kilohertz (see line 2104) provides for a more even distribution of sound pressure level. At a second and higher vibrational frequency of 19 kilohertz a similar type of vibrational beaming occurs with an acoustic null occurring at 30° at a vibrational frequency of 19 kilohertz. The purpose of this polar response chart is to show that by implementing a modal coupler adapted to receive two motors allows for a much narrower spacing of the inner coupling locations of 18 mm instead of 50 mm, the frequency at which an acoustic null occurs can be moved from 6.8 kilohertz up to 19 kilohertz, which is effectively beyond the audible bandwidth for most human listeners.

Figure 22:
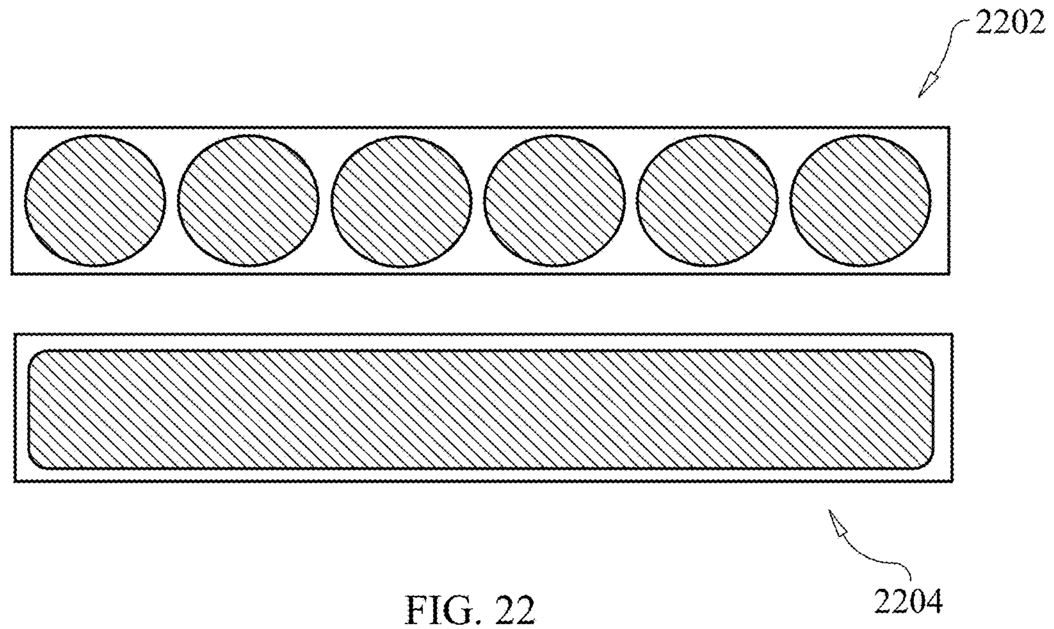
FIG. 22 is an illustration of alternative packaging arrangements for acoustic diaphragms in an embodiment.

FIG. 22 is an illustration of two alternative commercial packaging arrangements for acoustic diaphragms. Given the increasing importance of having high quality audio signals generated from compact or smaller spatial locations for transducers, a variety of alternative structural arrangements have been developed to accommodate this growing need. An array of six small circular drive units is shown in image 2202 in one deployment embodiment. A single high aspect ratio driver unit is shown as an alternative structural arrangement (see image 2204). It should also be realized that a variety of geometric structures can be supported by the use of high aspect ratio diaphragms driven by alternatively shaped modal couplers (e.g., rectangular, circular, racetrack, etc.).

Figure 23:
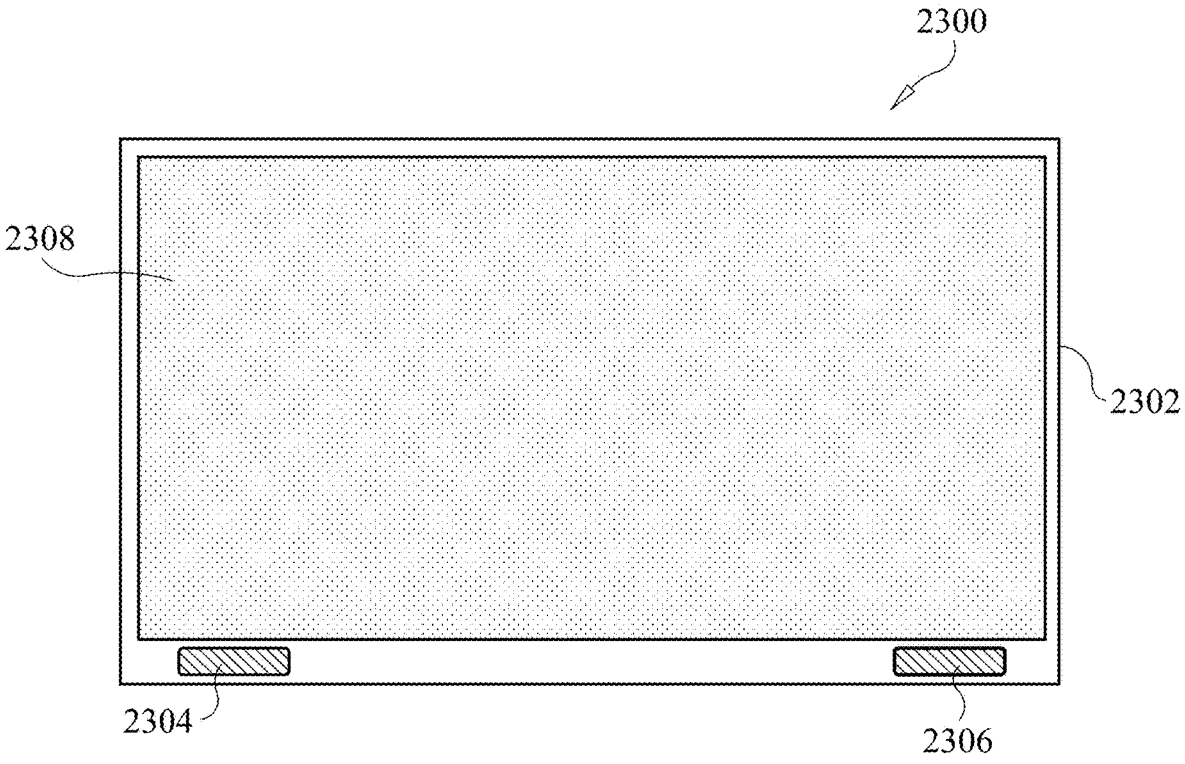
FIG. 23 is an illustration of a device using small, integrated high aspect ratio diaphragms in an embodiment.

FIG. 23 is an illustration of a device 2300 using small integrated high aspect ratio diaphragms that are driven by modal couplers in an embodiment. In this illustrated embodiment, a television screen or computer monitor is shown having a couple of integrated high aspect ratio diaphragms 2304 and 2306. These diaphragms are integrated into a thin bezel 2302 having a thin diameter which is an increasingly common design choice by manufacturers of these types of electronic display devices. This design arrangement demonstrates the growing need for a small, compact acoustic diaphragms that can be driven to provide acoustic output performance that is comparable or better than existing conventional or prior art alternatives.

Figure 24:
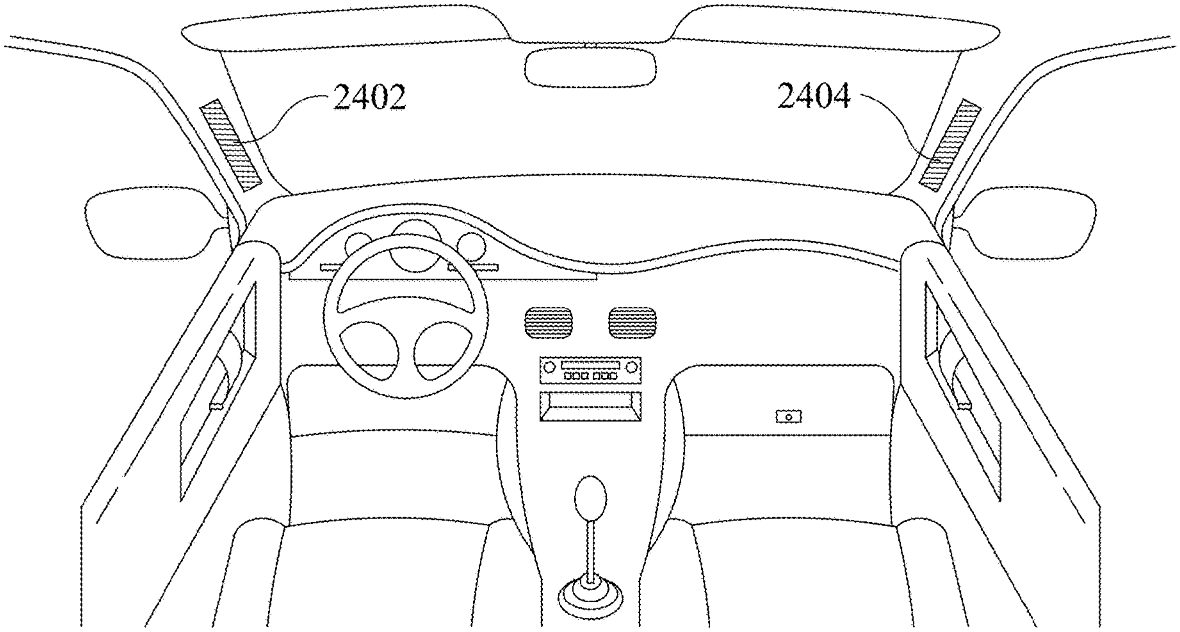
FIG. 24 is an illustration of small, integrated high aspect ratio diaphragms used in an automobile in an embodiment.

FIG. 24 illustrates a commercial application of small integrated diaphragms used in an automobile. As shown, small compact high aspect ratio audio transducers 2402, 2404 can be integrated into the body of certain automobiles to provide high quality acoustic performance in terms of audio sound pressure level and audio sound power level within an automobile cabin. In these types of applications where the listener is relatively close to the loudspeakers, it is particularly important to use acoustic drive units, such as the high aspect ratio audio transducers described herein, that achieve wide acoustic coverage over a wide bandwidth and present a smooth sound power response to ensure the listener does not experience unpleasant variations in the acoustic field that could adversely affect intelligibility and the natural sound quality of the acoustic signal.

Figure 25A:
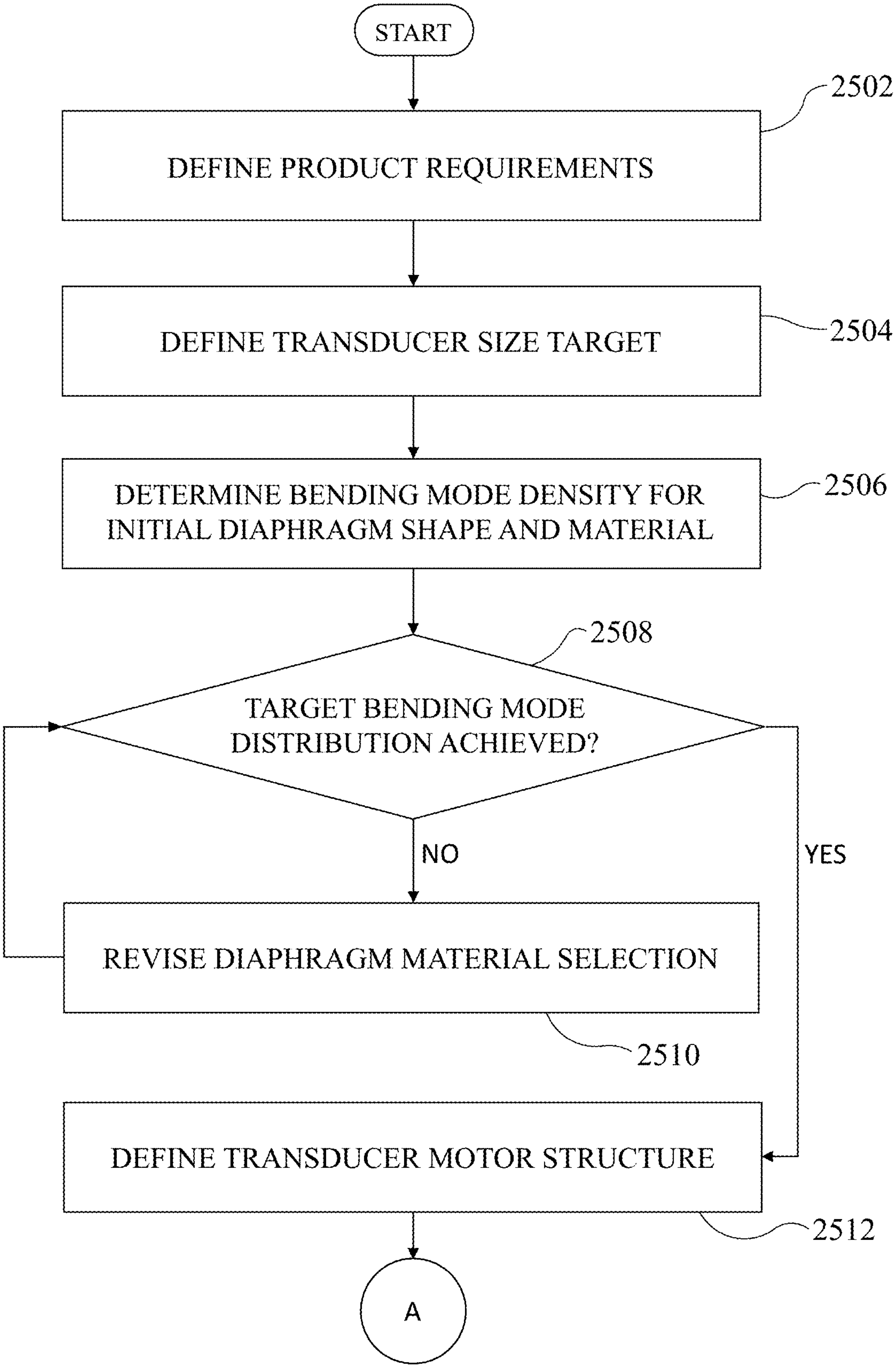
FIG. 25A is a flowchart illustrating aspects of a method for designing a high aspect ratio audio transducer in an embodiment.

FIG. 25A is a flowchart illustrating the initial steps of a method for designing a high aspect ratio audio transducer in an embodiment. In the illustrated flow chart, the design process starts with the definition of product requirements for a high aspect ratio audio transducer (step 2502) which requirements are generally referred to as target transducer parameters. Among the target transducer parameters to be defined are the following: external dimensions, bandwidth, maximum sound pressure level ("SPL"), acoustic directivity, and target economic cost of the motor drive unit. Based on the defined set of target transducer parameters, a target transducer size is defined as shown at step 2504. Transducer size is influenced by several factors not the least of which is the intended commercial application space for the transducer, the power handling requirements for the transducer, the duration of performance for the transducer, and the target sound pressure level and sound power level for the transducer. In addition to the transducer size, the design process further requires the determination of the bending mode density for an initial choice of diaphragm shape and material, as shown at step 2506. The terms shape and geometry are used interchangeably as is well known by those skilled in the art of designing audio transducers. As such, uses of these terms are intended to convey the same concept, namely, the structural form of a diaphragm and a modal coupler design. The shape of a diaphragm is dependent upon the commercial application and can be of a rectangular, circular, or a racetrack shape and have various structural materials used for its creation. In alternative embodiments. the structural material used to create a diaphragm can be a monolithic material or a composite structure of materials. The composite structure can be constructed from a core of foamed plastic, balsa wood, or thin walled paper, plastic or a metal honeycomb structure, sandwiched between thin skin structures made from a paper material, a plastic material or a metal foil. In a common embodiment, the diaphragm is comprised of a honeycomb core structure upon which thin skin like structures are applied to create the two surfaces of the diaphragm, one inner surface providing a face to be connected to a modal coupler and one outer or exterior surface providing a face for the radiation of acoustic signals.

Figure 25B:
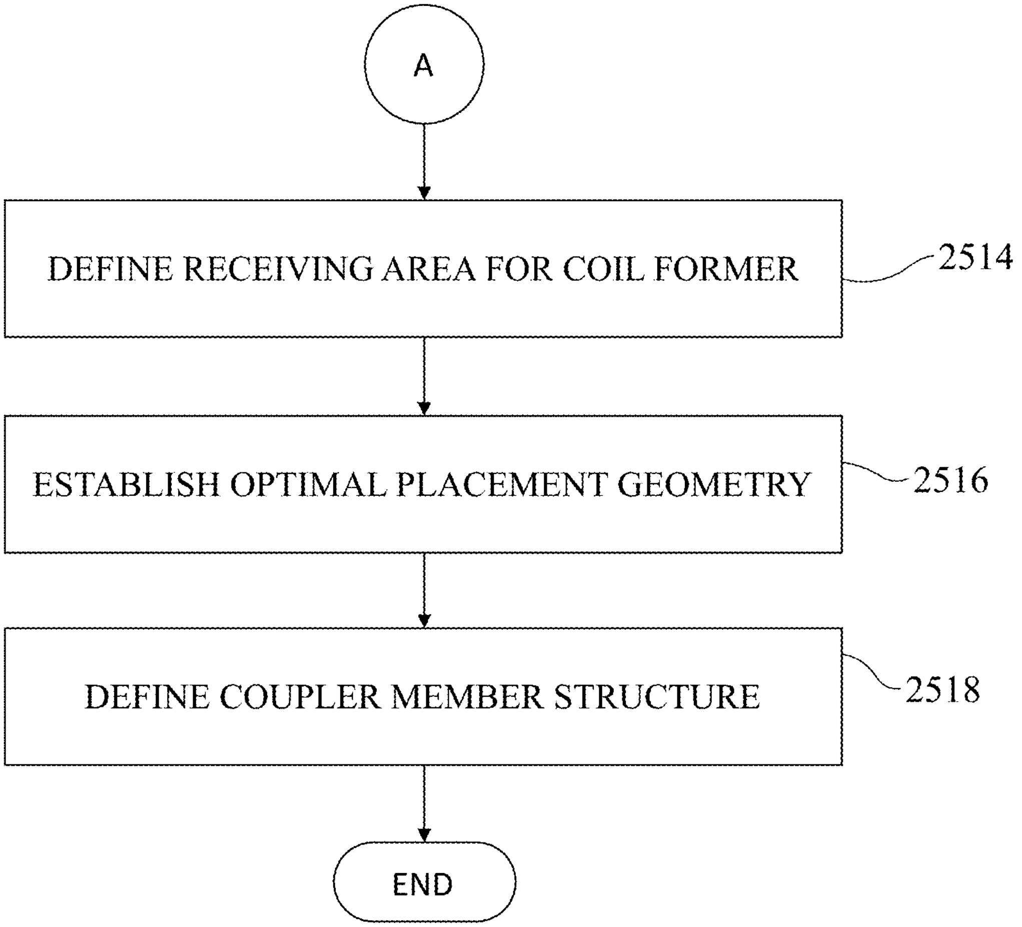
FIG. 25B is a flowchart illustrating aspects of a method for designing a high aspect ratio audio transducer in an embodiment.

An important feature of a radiating diaphragm is its bending mode distribution and the design process requires close review and analysis of the bending modes of the selected diaphragm geometry and materials. The target bending mode distribution of the diaphragm must be capable of providing a desired acoustic sound pressure level and a desired acoustic sound power level for a defined shape and form factor of the diaphragm and transducer. The assessment to be performed is reflected at step 2508 where the design is tested to determine whether a target bending mode distribution has been achieved. If a target bending mode has not been achieved, then one or more revisions must be made to the selected diaphragm material, as shown at step 2510, and further analysis is performed to determine if the target bending mode distribution has been achieved after such revisions. If a target bending mode distribution has been achieved, then a suitable transducer motor structure is to be defined, as shown at step 2512. The steps involved in defining a transducer motor structure include selecting a suitably shaped voice coil former for insertion into a shaped central body of a modal coupler, a voice coil to be wound upon the shaped voice coil former, a magnet, a pole piece for mounting upon the magnet, a motor return cup for securely mounting the magnet and housing these components. In alternative embodiments, the selection may include selecting multiple voice coil formers and voice coils for insertion into a multiple motor modal coupler where multiple motors are needed to drive a diaphragm based on commercial application and sound pressure level and sound power level requirements FIG. 25B is a flow chart illustrating the remainder of the process for designing a modal coupler in an embodiment. After defining the transducer motor structure, step 2512, a receiving area for a voice coil former must be defined which involves determining the shape of the receiving area, determining the depth of a mating for receiving a voice coil former (or multiple voice coil formers in alternative embodiments), in the shape of a receiving lip around the receiving area to ensure a voice coil former is properly centered as shown at step 2514. Once the receiving area is defined, the optimal placement geometry for a modal coupler must be established, as shown at step 2516. The establishing of the placement geometry for a modal coupler involves a structural-acoustic analysis that determines where the coupling feet of a modal coupler are to be placed on the inner surface of a diaphragm to ensure optimal transfer of the mechanical driving force from the drive unit to the diaphragm through a modal coupler. Once this geometry is established, the complete modal coupler member structure can be defined, as shown at step 2518, which includes selecting the outer connecting arms, the inner connecting arms, suitable shapes and designs of the coupling feet to be attached to the connecting arms, and defining one or more shaped central bodies suitable for receiving one or more inserted voice coil formers.

Figure 26:
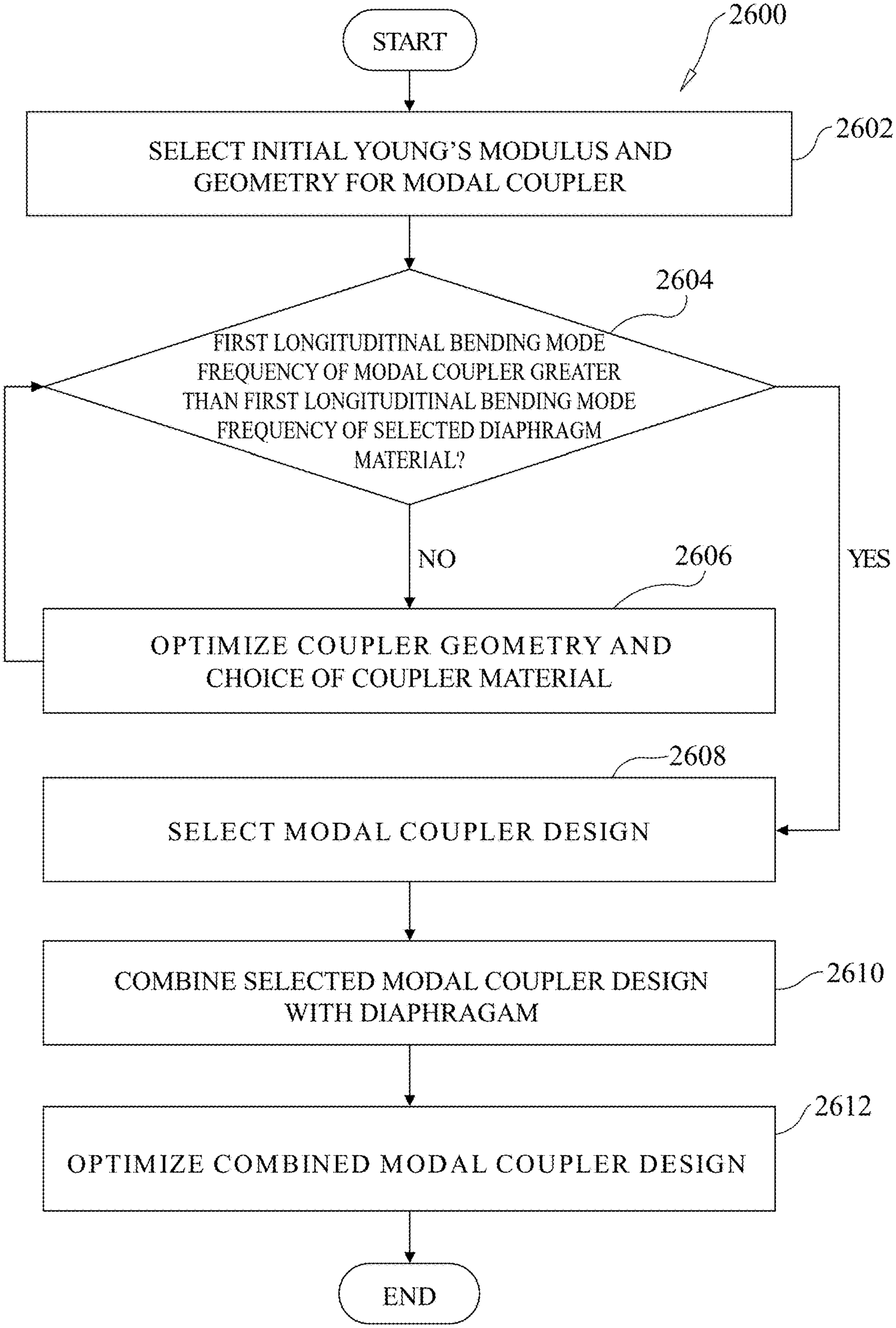
FIG. 26 is a flow chart illustrating a method for making a modal coupler in an embodiment.

FIG. 26 is a flow chart 2600 illustrating a process for making a modal coupler in an embodiment. In this illustrated embodiment, the process commences with the selection of a geometry and desired Young's modulus for a modal coupler material, as shown at step 2602. In determining a suitable modal coupler material, an important condition is to have a first longitudinal bending mode frequency of a modal coupler be greater than a first longitudinal bending mode frequency of a selected diaphragm geometry and material, as shown at step 2604. Although this is an important condition, satisfying this condition alone is insufficient as it merely serves as a starting point for further iterative fine-tuning. This starting point will allow the outer connecting arms of a modal coupler to smoothly decouple from a diaphragm at higher frequencies. It also prevents lower frequency longitudinal bending modes of the modal coupler from degrading the frequency response of a motor drive unit. As described earlier in the discussion relating to FIG. 3B, if a modal coupler is too soft, significant modal coupler bending modes could adversely affect the frequency response of the drive unit. In contrast, a modal coupler that is too rigid will overly restrain the diaphragm's modal movement resulting in a piston-like radiator. In this case, although the on-axis response may not be strongly affected, the off-axis acoustic radiation will be degraded. Therefore, when this condition is not satisfied, a designer must further optimize the modal coupler geometry and the choice of structural material for the modal coupler, as shown at step 2606. This process is iterative and continues until the objective condition is satisfied, shown at step 2604. When this condition is satisfied, a modal coupler design is selected, as shown at step 2608, and then the selected modal coupler design will be combined with a diaphragm comprised of a selected diaphragm material, as shown at step 2610. Once combined, further optimization is performed on the combined modal coupler design and diaphragm structure until the desired acoustic output is achieved, as shown at step 2612.

The optimization to be performed commences with the determination of an acoustic radiation field of the diaphragm while in vibrational operation in a selected combination, determining an SPL response and an SWL response of the acoustic radiation field, comparing the determined SPL response and SWL response to one or more target transducer parameters, and repeatedly adjusting one or more of a set of transducer design parameters until the one or more target transducer parameters are satisfied. The set of transducer design parameters to be adjusted includes the material properties of the selected material for the modal coupler design, such as the Young's modulus and mass density of the material, the selected structural geometry and material of the modal coupler design, and a selected thickness of the diaphragm.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

What is claimed is:

1. A system comprising:

a diaphragm configured for radiating acoustic signals, the diaphragm having a first face and a second face;

a roll surround disposed around a perimeter of the first face of the diaphragm;

a modal coupling apparatus comprising a plurality of connecting arms and a central body, each of the plurality of connecting arms having a mounting foot, the modal coupling apparatus coupled to the second face of the diaphragm using the plurality of connecting arms, the central body having a shaped first end for receiving a voice coil former;

a voice coil having a first end and a second end, the voice coil wound upon and secured to an outer surface on a first end of the voice coil former, a second end of the voice coil former placed within the shaped first end of the central body; and a positive electrical terminal and a negative electrical terminal, each terminal coupled to the voice coil for transmitting an electrical current through the voice coil upon receiving electrical power;

wherein the voice coil is suspended within a magnetic field in an air gap, the air gap defined between a vertical portion of a motor return cup on a first end and a pole piece mounted upon a magnet on a second end, the magnet securely mounted onto an inner surface of the motor return cup, wherein the magnet generates a static magnetic field normal to a directional flow of the electrical current through the voice coil to generate an electromagnetic force on the voice coil upon the receiving of electrical power, the electromagnetic force producing a mechanical driving force acting on the diaphragm through the voice coil former and modal coupling apparatus.

2. The system of claim 1 wherein the diaphragm is one of a monolithic structure and a composite structure.

3. The system of claim 2 wherein the diaphragm having the composite structure is comprised of a core, a first thin skin structure and a second thin skin structure, the core placed between the first thin skin structure and the second thin skin structure, each of the first thin skin structure and the second thin skin structure comprised of at least one of a paper material, a plastic material, and a metal foil, the first thin skin structure forming the first face of the diaphragm, the second thin skin structure forming the second face of the diaphragm.

4. The system of claim 3 wherein the core is one of a honeycomb structure and a foamed structure.

5. The system of claim 2 wherein the diaphragm is one of a rectangular shape and a racetrack shape.

6. The system of claim 1 wherein the shaped first end of the central body has a shape that is one of a circular shape and a racetrack shape.

7. The system of claim 1 wherein the voice coil former has a circular shape when placed within the shaped first end of the central body having a circular shape.

8. The system of claim 1 wherein the voice coil former has a racetrack shape when placed within the shaped first end of the central body having a racetrack shape.

9. The system of claim 1 wherein the diaphragm is comprised of a structural material having a plurality of bending modes over an operating bandwidth when radiating acoustic signals.

10. The system of claim 1 wherein the modal coupling apparatus has a first longitudinal bending mode when vibrating in response to the mechanical driving force.

11. The system of claim 10 wherein the diaphragm has a first longitudinal bending mode frequency when vibrating in response to the mechanical driving force transferred from the vibrating modal coupling apparatus, a first longitudinal bending mode frequency of the modal coupling apparatus being greater than the first longitudinal bending mode frequency of the diaphragm.

12. The system of claim 1 wherein the plurality of connecting arms and the central body are comprised of a structural material including at least one of a metal, a plastic, a glass fiber and a carbon fiber, the metal being one of a set including aluminum, titanium and magnesium, the plastic being one of a set including ABS, polycarbonate, polypropylene, and nylon/POM.

* * * * *